US012780239B2

(12) United States Patent
Narayanan et al.

(10) Patent No.: US 12,780,239 B2
(45) Date of Patent: Nov. 3, 2026

(54) VEHICLE TRAJECTORY TREE SEARCH FOR OFF-ROUTE DRIVING MANEUVERS

(71) Applicant: Zoox, Inc., Foster City, CA (US)

(72) Inventors: Sriram Narayanan, San Jose, CA (US); Steven Cheng Qian, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 438 days.

(21) Appl. No.: 18/072,015

(22) Filed: Nov. 30, 2022

(65) Prior Publication Data

US 2024/0174256 A1 May 30, 2024

(51) Int. Cl.
*B60W 60/00* (2020.01)

(52) U.S. Cl.
CPC ...... *B60W 60/001* (2020.02); *B60W 60/0013* (2020.02); *B60W 60/0015* (2020.02); *B60W 2520/06* (2013.01)

(58) Field of Classification Search
CPC ........... B60W 60/001; B60W 60/0013; B60W 60/0015; B60W 2520/06; B60W 30/18163
USPC ........................................................... 701/25
See application file for complete search history.

(56) References Cited

U.S. PATENT DOCUMENTS

2021/0095976 A1* 4/2021 Sarkar ................ G01C 21/3453
2021/0197798 A1* 7/2021 Funke ................ B62D 15/0285
2021/0373566 A1* 12/2021 Agarwal ......... B60W 30/18145
2022/0055651 A1 2/2022 Baric
2022/0212693 A1 7/2022 Fang
2022/0221294 A1 7/2022 Kumar

OTHER PUBLICATIONS

Spicelogic.com, “Modeling Markov Chain and Markov Decision Process”, “Introduction to the Markov Models”, Spicelogic.com, 2022 (Year: 2022).*
PCT Search Report and Written Opinion mailed Apr. 1, 2024 for PCT Application No. PCT/US2023/081586, “Vehicle Trajectory Tree Search for Off-Route Driving Maneuvers”, 11 pages.

* cited by examiner

*Primary Examiner* — Hitesh Patel
*Assistant Examiner* — Shien Ming Chou
(74) *Attorney, Agent, or Firm* — Lee & Hayes, P.C.

(57) ABSTRACT

Techniques are discussed herein for generating trajectories for controlling motion and/or other behaviors of vehicles in driving environments. In particular, techniques are described herein for using a tree search to determine a trajectory for a vehicle to join a driving route from an initial vehicle state off of the driving route structure. A vehicle computing system may determine various candidate trajectories, including trajectories based on an off-route inertial reference frame, additional trajectories based on the route structure, perturbed trajectories, etc. The set of candidate trajectories may be optimized and/or filtered based on objects in the environment, and the corresponding candidate actions may be used to generate a search tree between the off-route vehicle state and an on-route target state. The costs associated with the candidate actions may be evaluated iteratively to determine a minimum cost traversal of the tree, representing a control trajectory to allow the vehicle to join the driving route structure.

20 Claims, 13 Drawing Sheets

500

VEHICLE TRAJECTORY TREE SEARCH FOR OFF-ROUTE DRIVING MANEUVERS

BACKGROUND

Autonomous driving may benefit from computing systems capable of determining driving paths and navigating along routes from an initial location toward a destination. For example, autonomous and semi-autonomous vehicles may utilize systems and components to traverse through driving environments including other objects, such as moving or stationary vehicles (autonomous or otherwise), pedestrians, buildings, etc. When traversing through such an environment, the vehicle may determine a trajectory based on sensor data from the perception systems of the vehicle, as well as map data of the environment. A planning system within an autonomous vehicle may include a computing system configured to navigate along designated routes from an initial location toward a destination according to a route-based reference frame, such as a Frenet reference frame. The route-based reference system may reduce the computational complexity associated with autonomous vehicle control in the environment. However, the route-based reference system may limit autonomous vehicle operations to the designated routes associated with the route-based reference frame. Such limitations may restrict the autonomous vehicle from performing particular actions, such as parking, pulling over, reversing, or the like.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
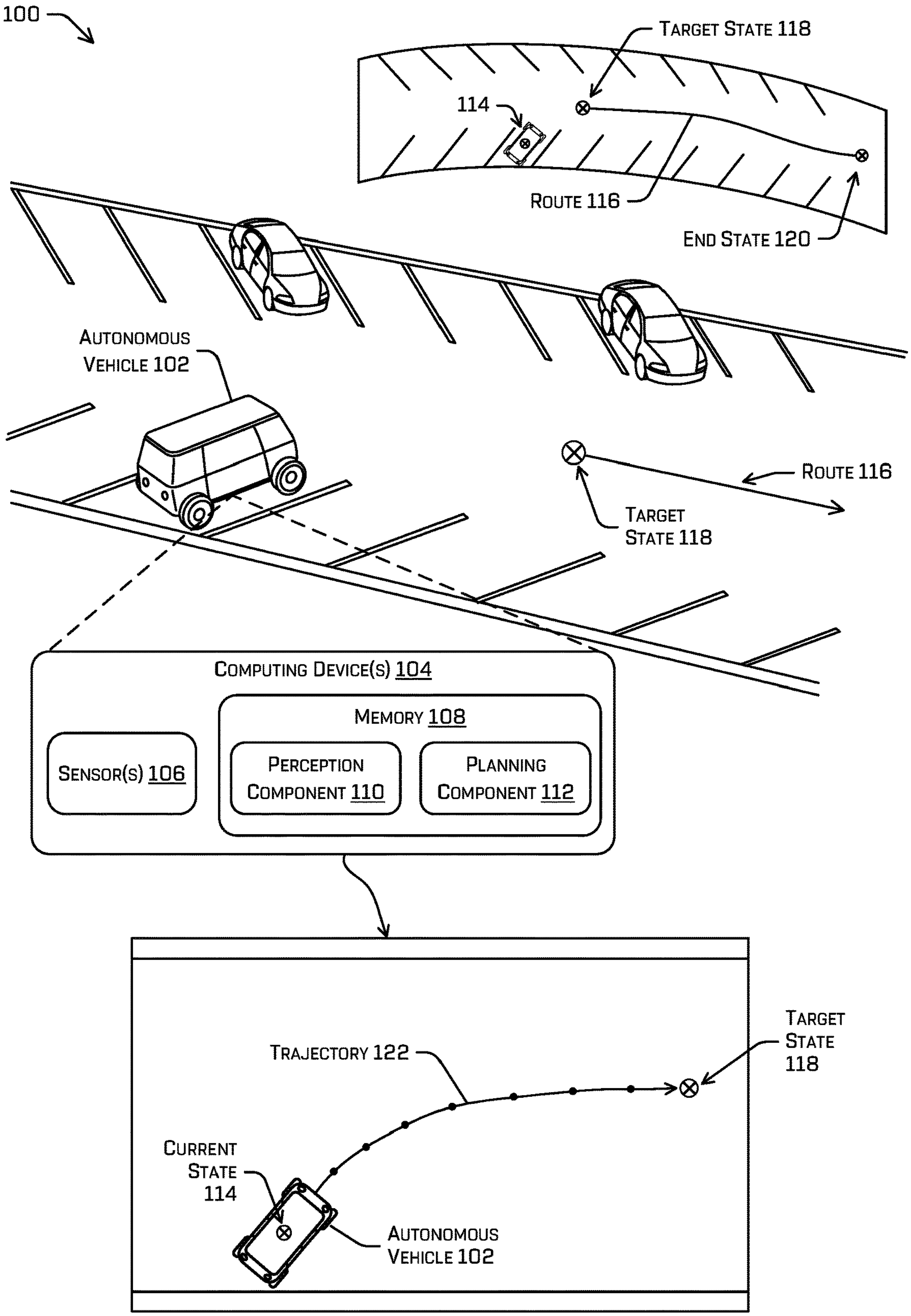
FIG. 1 illustrates an autonomous vehicle and an example scenario in which a trajectory is determined to control the autonomous vehicle from an initial off-route state to an on-route target state in a driving environment, in accordance with one or more examples of the disclosure.

This application relates to determining driving trajectories for vehicles between various states (which may include, for example, positions, velocities, accelerations, steering angles, yaw rates, and the like) and/or translating between control regimes based at least in part on differing coordinate frames in a driving environment. In particular, techniques are described herein for determining trajectories for a vehicle to join a driving route from an initial off-route vehicle state (e.g., a state on which vehicle motion is independent of a map element (e.g., a lane), reference line, or other reference used to constrain vehicle motion). The vehicle may be in an off-route state, for example, while parking or unparking, pulling off of or onto the road, reversing or performing other uncommon driving maneuvers, or while driving in unstructured environments such as parking lots, driveways, or construction zones.

As described below in more detail, a planning component of the vehicle may determine a number of candidate trajectories to move the vehicle from a current off-route vehicle state (e.g., a vehicle state having an absence of a lane constraint) to a target state in a driving lane of the route associated with the vehicle (e.g., a vehicle state having a lane constraint). Various candidate trajectories may include, but are not limited to, inertial-based trajectories generated (e.g., using mathematical functions) based on an inertial reference system, route-based trajectories determined based on the structure of the driving route, previous control trajectories of the vehicle, and/or perturbed trajectories that may include laterally shifting and/or velocity scaling various other candidate trajectories. The set of trajectories may be optimized and/or filtered based on objects in the driving environment, and the resulting modified candidate trajectories may be used to generate a decision search tree between the current off-route vehicle state and the target state on the driving route. Various costs associated with the candidate actions may be evaluated iteratively to determine a minimum cost traversal of the tree, representing a control trajectory to allow the vehicle to join the driving route.

Although certain examples herein describe determining and evaluating candidate trajectories to determine a control trajectory for a vehicle, in other examples similar or identical techniques may be used to determining and evaluating candidate driving paths and determining a control driving path for the vehicle. As described in more detail below, as used herein a trajectory may refer to a sequence of spatiotemporal vehicle states. In contrast, a path may refer to sequence a vehicle states lacking associated temporal information. Although various examples described herein may refer to trajectories (e.g., candidate trajectories, optimal trajectories, etc.), these examples may include determining trajectories and/or paths for a vehicle to join a driving route from an initial off-route vehicle state.

The various examples and techniques described herein may be implemented in a number of ways to improve the operation of autonomous vehicles and the functioning of computing systems. These techniques may improve the functioning, safety, and efficiency of autonomous and semi-autonomous vehicles operating in real-world driving environments, by determining improved driving trajectories (and/or driving paths) through the environments, taking into account passenger and vehicle safety, driving efficiency, kino-dynamic feasibility of the vehicle, and various other cost-based metrics.

When an autonomous vehicle performs on-route driving, the vehicle may navigate along designated driving routes (e.g., routes corresponding to sequences of roads, driving lanes, etc.), may navigate between waypoints associated with the designated routes, or may otherwise plan a trajectory based on some constraint such as a lane marking, a reference line, or other reference. The planning component may control the vehicle along the designated routes based at least in part on a route-based reference system (e.g., a Frenet frame, curvilinear coordinate frame, etc.). For example, the planning component may receive a request to navigate the vehicle to a particular location, and may determine one or more driving routes based on, for instance, map data of the environment, the current location of the vehicle, the destination location, etc. The planning component may cause the vehicle to travel along the determined route(s) toward the destination location based on a route-based reference system. For instance, each road and/or driving lane along the route may include a sequence of target states (e.g., lane reference states) defining a desired trajectory along the road or driving lane. While driving on the driving route, the planning component may use a controller to track the current state of the vehicle relative to the lane reference states, and adjust the vehicle navigation (e.g., velocity, steering angle, etc.) based on the lane reference states.

However, in some situations, an autonomous vehicle may be required to operate off-route, or off of the designated driving route associated with the vehicle. For example, when a vehicle is parking or unparking, has pulled over to the side of the road, or is in a driveway or off-road location, the vehicle may no longer be operating on the designated driving route. In the case of parking lots, for instance, the area may be devoid of defined lanes for driving and, as such, there are no lane references to track against for vehicle motion. In some cases, the vehicle may be in an off-route state even when the vehicle is located on the driving lane of its designated driving route. For instance, if the vehicle is within the on-route driving lane, but is reversing, performing a U-turn, and/or if the vehicle heading significantly diverges from the direction of travel of the driving lane, then the vehicle may be considered off-route relative to the lane reference trajectory of the driving lane. When the vehicle is in an off-route state, the planning component may use an alternative inertial-based reference system, rather than the route-based reference system, for controlling the vehicle. In some examples, an inertial-based reference system may include a body-centric reference system, such as that based on an X-Y-Z reference from the vehicle. For example, the planning component may detect an object in the environment and may determine a location associated with the object based on a lateral distance (X) and distance ahead of or behind (Y) the vehicle. In other examples, (X) may represent a longitudinal distance and (Y) may represent a lateral distance. Of course, additional dimensions are contemplated. When using the inertial-based reference system, the planning component may control the vehicle by determining off-route trajectories between various off-route locations (e.g., parking locations, curbside pickup locations, etc.).

For these reasons, performing off-route driving maneuvers by autonomous vehicles may include a number of additional technical challenges that may not apply when performing on-route maneuvers. For instance, a driving lane on a designated driving route may have a reference (or baseline) trajectory that is predetermined for the driving lane and stored in the map data used by the vehicle. A reference trajectory for a driving lane may include, for example, a sequence of vehicle states representing positions in the center of the driving lane/roadway and representing a heading and velocity corresponding to the lane direction and current speed limit of the roadway. For on-route navigation, reference trajectories can be used to determine an optimal trajectory, determine driving corridors to traverse around objects, and measure progress along the route. In contrast, for off-route driving maneuvers, there is no lane reference trajectory for the autonomous vehicle to use. As a result, when performing off-route driving maneuvers, it may be difficult for the autonomous vehicle to determine optimal control trajectories and/or to measure progress toward a target or destination. Additionally, certain autonomous vehicles may maintain two separate reference systems that are each capable of computing trajectories, such as a route-based reference system and a separate inertial-based reference system. In such cases, it may be difficult for the autonomous vehicle to determine when to transition between reference systems (e.g., at or near or road boundary), and to know which reference system may provide the optimal trajectory to perform various driving maneuvers.

To address these technical challenges and to improve vehicle safety and efficiency in such situations, the techniques described herein relate to determining trajectories and controlling autonomous vehicles as they move from off-route vehicle states to target states on the designated driving route of the vehicle. To perform such a maneuver, the planning component may initially determine a target state within the route structure of the designated driving route associated with the vehicle. In some examples, the planning component may determine a particular target state in a driving lane reference trajectory based on any combination of the lateral and/or longitudinal distance between the vehicle and the various target states in the lane reference trajectory, the current heading of the vehicle relative to the direction of travel of the driving lane, the current velocity of the vehicle, and/or various features or capabilities of the vehicle such as the turning radius and maximum steering angle of the vehicle. In some examples, the planning component 112 may determine multiple target states associated with different driving lanes onto which the vehicle may join the route. Examples of various techniques for determining target states for an off-route vehicle in a lane reference trajectory can be found, for example, in U.S. patent application Ser. No. 16/732,122, filed on Dec. 31, 2019, and titled, "Vehicle Control To Join Route," which is incorporated by reference herein in its entirety for all purposes.

After determining which on-route target state the autonomous vehicle will navigate to in the driving maneuver, the planning component may determine a number of candidate trajectories to control the vehicle to reach the target state from its current off-route state. As used in these examples, a "state" or "vehicle state" may include geometric state data (e.g., position, pose, heading, yaw, steering angle, etc.) as well as movement data for the vehicle (e.g., velocity, acceleration, yaw rate, steering angle rate, etc.). A "trajectory" may refer to a sequence of states through which the vehicle may traverse from a start state to an end state. For example, a trajectory may be defined as a sequence of spatiotemporal states, in which each state is specified by any combination of an x-position, a y-position, a yaw, a yaw rate, a steering angle, a steering angle rate, a velocity, and/or an acceleration, etc. There may be any number of possible trajectories that the vehicle can take to traverse from a start state to an end state (or target state), including different positions, steering angles, velocities, and/or accelerations at the different intermediate states in the trajectory.

In some examples, the planning component may determine a candidate trajectory in accordance with an inertial-based reference system. For instance, in the inertial-based reference system, a reference (or baseline) trajectory may be determined between the current vehicle state and the target state using a mathematical function, such as a cubic spline curve, a Bezier curve, a series of clothoids, and/or any other closed-form boundary condition solution. In some examples, the closed-form boundary condition solution may include a number of free variables that is the same or close to a number of constraints associated therewith. In such an example, the closed-form boundary condition solution may result in a single solution (e.g., a single reference trajectory).

Additionally or alternatively, the planning component may determine a separate candidate trajectory in accordance with the route-based reference system. For example, the planning component may determine a route-based reference trajectory based on the lane reference trajectory states at the positions on the driving lane closest to the current state of the vehicle. The planning component then may modify the lane reference trajectory so the vehicle "tracks" (e.g., attempts to converge on) the lane reference trajectory. For instance, the planning component may modify the lateral offset, velocity, steering angle, etc., of the lane reference trajectory states into a route-based reference trajectory that may cause the vehicle to converge on the target state.

In some examples, the planning component may determine a set of candidate trajectories including one or more trajectories generated using the inertial-based reference system, and one or more additional trajectories generated using the route-based reference system. In other examples, the planning component may generate trajectories based on only one of these reference systems and may exclude the other. For instance, at some point during the driving maneuver, the planning component may determine that the vehicle is on the driving lane but is not yet at the target state. As an example, the planning component may use a heuristic to determine that the vehicle is on the driving lane when all four corners of the vehicle are on the surface of the driving lane/roadway and the heading of the vehicle is within 90 degrees of the direction of the driving lane. In this example, at this point during the driving maneuver, the planning component may determine to generate one or more trajectories using the route-based reference system, but might not generate any trajectories using the inertial-based reference system.

As another example, the planning component may use another heuristic to determine that the vehicle is greater than a threshold distance from the driving lane (e.g., 5 m, 10 m, 20 m, . . . , etc.) and/or greater than a threshold heading different from the direction of driving lane (e.g., greater than 90 degrees). In this example, the planning component may determine that the current vehicle state is too far away and/or too angled relative to the lane reference trajectory, and thus any trajectories generated using the route-based reference system may result in large tracking errors. Thus, at this point during the driving maneuver, the planning component may determine to generate one or more trajectories using the inertial-based reference system, but might not generate any trajectories using the route-based reference system.

In still other examples, the planning component may generate at least one candidate trajectory using the inertial-based reference system, and at least one candidate trajectory using the route-based reference system, at each processing cycle executed by the planning component. As described below, the vehicle may be configured to determine a new control trajectory during each processing cycle of the planner component while performing the driving maneuver, until the vehicle reaches the target state on the driving route. Thus, at each processing cycle, the planning component may generate an additional set of candidate trajectories based on the current state of the vehicle at that processing cycle and the target state. The number and type of the candidate trajectories generated by the planning component may vary between the different processing cycles during which the off-route to on-route driving maneuver is being performed. Then, at each processing cycle during the maneuver, the planning component may generate a decision search tree (or search tree) based on the candidate trajectories to determine a control trajectory, as described in more detail below.

In addition to (or alternatively to) candidate trajectories generated using the inertial-based reference system and/or the route-based reference system, the planning component may generate additional candidate trajectories to move the vehicle from its current off-route state to the on-route target state. In some cases, the planning component may determine, as an additional candidate trajectory, the control trajectory determined and executed by the vehicle in the previous processing cycle during the driving maneuver.

The planning component also may determine additional candidate trajectories for performing the driving maneuver by perturbing any other candidate trajectory generated using any of the techniques described herein. For instance, one or both of the route-based reference trajectory and/or the inertial-based reference trajectory described above may be perturbed (e.g., modified) using one or more perturbation parameters. A single candidate trajectory can be perturbed into any number of additional candidate trajectories by laterally shifting the trajectory using one or more lateral shifting parameters, and/or by rescaling the velocity of the trajectory using one or more velocity scaling parameters.

After generating the set of candidate trajectories from the current off-route vehicle state to the on-route target state, the planning component may perform trajectory optimization and/or filtering on the set of candidate trajectories. During the trajectory optimization, the planning component may modify each candidate trajectory based on one or more objects detected in the driving environment. For example, the trajectory optimization performed on each candidate trajectory may modify (and/or exclude) the trajectory so that the modified trajectory takes into account the current state of the driving environment, including the current vehicle state, the state of the vehicle relative to the map data, and/or the static and dynamic objects perceived by the vehicle's sensors. As an example, in some cases, any candidate trajectories that intersect with the position of a static object in the environment may be filtered out and excluded from the decision search tree. In contrast, candidate trajectories that intersect with a dynamic object may be retained by modified to avoid the likelihood of an intersection with the dynamic object. After the trajectory optimization and/or filtering, each of the remaining candidate trajectories may be a kino-dynamically feasible and static-aware (e.g., not intersecting with a static object) trajectory starting at the current off-route vehicle state and ending at the on-route target state.

In some examples, the planning component may use a tree search technique to evaluate the set of candidate trajectories determined from the current off-route vehicle state to the on-route target state. The tree search technique may iteratively determine sets of candidate actions based on the candidate trajectories, and predict the potential future states of the vehicle responsive to the candidate actions. Examples of various techniques for using tree searches to the control motion of autonomous vehicles, based on determining a candidate action and predicting a future state based on the candidate action can be found, for example, in U.S. patent application Ser. No. 17/394,334, filed on Aug. 4, 2021, and titled, "Vehicle Trajectory Control Using A Tree Search," and U.S. patent application Ser. No. 17/900,332, filed on Aug. 31, 2022, and titled, "Vehicle Trajectory Tree Search," each of which is incorporated by reference herein in their entirety for all purposes.

In some examples, the planning component may perform the tree search by initially determining a candidate action associated with each of the candidate trajectories. For instance, during the tree search, the planning component may determine a first set of potential candidate actions for the vehicle from its current off-route state in the environment, and a set of predicted future states of the vehicle (and/or of the environment) at a first future time step based on the candidate actions. Based on the predicted vehicle and/or environment states, the planning component may evaluate the potential candidate actions, and select one or more of the candidate actions for further exploration, while discarding other candidate actions. For the selected candidate action(s), the planning component may determine additional sets of candidate actions based on the predicted state(s) of the vehicle and/or environment at the first future time step, and an additional set of predicted future states of the vehicle and/or environment associated with the candidate actions at a second future time step, and so on, until the tree search reaches the target on-route vehicle state.

A candidate action may indicate, for example, state data within a candidate trajectory for controlling the motion of the vehicle, including potential actions and/or control commands for the vehicle (e.g., velocity commands, acceleration commands, steering angle commands, yaw commands, etc.). In some cases, candidate actions also may include commands for activating emitters of the vehicle (e.g., a turn signal, a headlight, a speaker), and/or the like. In some examples, each candidate action determined by the planning component may be associated with a different action node of a tree structure, and each predicted vehicle and/or environment state may be associated with an associated prediction node of the tree structure. As an initial operation, the tree search may determine, based at least in part on sensor data, the current off-route state associated the vehicle, which may include the current state of the vehicle itself, the current state of the driving environment, and any number of static objects and/or dynamic objects in the environment. The current off-route vehicle state may be associated with a root node in a tree structure generated by the planning component. In some examples, the state of the vehicle and/or environment may be indicated by a data structure (e.g., a scene embedding or encoding) associated with the root node.

Using the current off-route vehicle state and environment associated with the root node, the planning component may commence the tree search by iteratively determining and evaluating sets of potential candidate actions for the vehicle, based on the set of candidate trajectories. Examples of candidate actions may include fine instructions such as velocities, velocity changes, steering angles, steering angle changes, yaw rates, yaw rate changes, and the like, that may be tracked by the vehicle controller. Using various candidate actions at each node in a tree search may provide a number of technical advantages for determining a trajectory for the vehicle to perform the off-route to on-route driving maneuver, including providing a relatively low-cost way to explore the search space robustly and quickly determining a low cost (e.g., minimal cost) traversal representing an improved (or optimal) trajectory for performing the maneuver.

After determining the set of candidate actions for a node in the tree search, the planning component may use a cost function to evaluate the candidate actions and select candidate action(s) from which to continue the tree traversal. When generating the tree structure the planning component may select one or multiple of the different candidate actions associated with a node for further exploration. As described below in more detail, the planning component may select the candidate actions for further exploration in the tree structure based on costs associated with each candidate action. In some examples, determining a cost for candidate action may include projecting the candidate action into a trajectory covering the length and/or time of the driving route (or a portion thereof), and then determining any number of constitute costs (described below) based on the projection of the candidate action.

For instance, for each candidate action, the planning component may compute a cost associated based on a number of different cost types, including safety costs (e.g., based on determining potential intersection points and/or other potential interactions between the vehicle and other objects in the environment, the proximity of the vehicle to non-drivable surface(s), etc.), comfort costs (e.g., velocity, acceleration, and/or jerk metrics associated with the candidate action, etc.), route progress costs (e.g., a displacement or progress metric based on the driving route, etc.), energy efficiency costs (e.g., based on the vehicle model and/or drive system in performing the candidate action and/or trajectory, etc.), law abidance costs, and the like. In some examples, a cost may be determined for each candidate action, which may be associated with a subsequent node (or candidate action node) in the tree that represents the updated vehicle state and the predicted environment state based on the selection of the candidate action. To evaluate the cost of a candidate action node, the planning component may sum (or otherwise aggregate) the costs associated with the nodes composing a branch of the tree structure including that candidate action (e.g., the cost of the candidate action node and the cost of all parent nodes from which the candidate action node depends, tracing back to the root node).

As noted above, when performing on-route driving maneuvers, progress costs may be measured relative to the lane reference states along the driving route of the vehicle. In contrast, in the examples described herein, progress costs may be determined relative to the references states of the trajectories determined for performing the off-route to on-route driving maneuver, rather than relative to the lane reference states. As an example, when performing an off-route to on-route driving maneuver using the techniques described herein, an initial portion of the optimal trajectory for the maneuver may move the vehicle perpendicular (or backward) relative to the desired road. In this example, the initial portion of the optimal trajectory might not make any progress relative to the lane reference states on the driving route, but may make progress relative to the reference states determined for the off-route to on-route driving maneuver. Accordingly, these techniques provide the additional advantages of allowing trajectory optimization (e.g., using the tree search) based on progress costs, as well as the additional costs described herein.

To generate the tree search, the planning component may iteratively, at each node in the search, determine a set of candidate actions (e.g., including inertial-based, route-based, and/or perturbed candidate actions), evaluate the associated candidate action nodes using one or more costs functions, and traverse the tree based on determining the one (or more) lowest-cost action nodes. The tree traversal may continue until the target state on the driving route is reached, at which time the planning component may identify one or more potential trajectories for controlling the vehicle, as the lowest-cost set(s) of nodes connecting the current off-route vehicle state to the target state on the driving route.

As these and other examples illustrate, the techniques described herein may improve the functioning, safety, and driving efficiency of autonomous and semi-autonomous vehicles. Specifically, these techniques may result in improved trajectory determinations for vehicles to follow to perform complex driving maneuvers between off-route and on-route vehicle states, which can be determined more quickly and using reduced computing resources than other trajectory determination/optimization techniques. Using these techniques, the planning component may determine optimal trajectories and/or measure progress along the route, even without a predetermined reference trajectory for the off-route driving path. Further, as described above, the planning component may generate a dense set of candidate trajectories using various techniques (e.g., inertial-based, route-based, and/or perturbed candidate trajectories, etc.), and then may process and evaluate the candidate trajectories in a similar manner and using the same tree search, regardless of the various techniques used to generate the trajectories. Additionally, these techniques avoid using inaccurate heuristics and mode-switching requirement between modes of different trajectory generation when performing off-route to on-route driving maneuvers. For instance, instead of determining an artificial boundary (or other heuristic) to switch between an inertial-based reference system and route-based reference system for trajectory generation, the techniques described herein may continuously use and evaluate multiple techniques throughout the driving maneuver.

As described below in more detail, certain examples herein may be implemented by a trajectory planner (e.g., a planning component) of an autonomous vehicle, which may include components to generate and traverse a tree search to determine a trajectory for the vehicle to follow. However, in other examples, similar or identical techniques to those described herein may be used with other types of data structures and/or other search algorithms. In various cases, tree searches may use binary tree structures including a single route-based candidate action and a single inertial-based candidate action for each node, or may use non-binary search trees in other examples (e.g., including any number of perturbed candidate actions). The various tree search algorithms that may be used may include, but are not limited to, depth-first searches and breadth-first searches, as well as tree traversal techniques using sequential and/or parallel computation, etc. In examples when other types of data structures are used (e.g., non-tree structures), other types of graph-based traversal algorithms also may be used to generate, evaluate, and traverse the nodes of the data structure to determine possible vehicle trajectories.

The techniques described herein may be implemented in a number of ways. Example implementations are provided below with reference to the following figures. Although discussed in the context of an autonomous vehicle, the methods, apparatuses, and systems described herein may be applied to a variety of systems (e.g., a sensor system or a robotic platform), and are not limited to autonomous vehicles. In one example, similar techniques may be utilized in driver-controlled vehicles in which such a system may provide an indication of whether it is safe to perform various maneuvers. In various other examples, the techniques may be utilized in an aviation or nautical context, and may be incorporated into any ground-borne, airborne, or waterborne vehicle using route planning techniques, including those ranging from vehicles that need to be manually controlled by a driver at all times, to those that are partially or fully autonomously controlled.

FIG. 1 illustrates an example scenario 100 including an autonomous vehicle 102 configured to determine a number of possible trajectories, and then to select a control trajectory for performing an off-route to on-route driving maneuver in an environment. In some instances, the autonomous vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 102 may be a fully or partially autonomous vehicle having any other level or classification. It is contemplated that the techniques discussed herein may apply to more than robotic control, such as for autonomous vehicles. For example, the techniques discussed herein may be applied to trajectory-finding in video games, manufacturing, augmented reality, etc.

According to the techniques discussed herein, the vehicle 102 may receive sensor data from sensor(s) 106 of the vehicle 102. For example, the sensor(s) 106 may include location sensors (e.g., a global positioning system (GPS) sensor), inertia sensors (e.g., an accelerometer sensor, a gyroscope sensor, etc.), magnetic field sensors (e.g., a compass), position/velocity/acceleration sensors (e.g., a speedometer, a drive system sensor), depth position sensors (e.g., a lidar sensor, a radar sensor, a sonar sensor, a time of flight (ToF) camera, a depth camera, and/or other depth-sensing sensor), image sensors (e.g., cameras), audio sensors (e.g., microphones), and/or environmental sensors (e.g., a barometer, a hygrometer, etc.).

The sensor(s) 106 may generate sensor data, which may be received by computing device(s) 104 associated with the vehicle 102. However, in other examples, some or all of the sensor(s) 106 and/or computing device(s) 104 may be separate from and/or disposed remotely from the vehicle 102 and data capture, processing, commands, and/or controls may be communicated to/from the vehicle 102 by one or more remote computing devices via wired and/or wireless networks.

The autonomous vehicle 102 may comprise computing device(s) 104 that may include one or more ML models and/or the navigation systems discussed herein. For example, the computing device(s) 104 comprise a memory 108 storing a perception component 110 and/or a planning component 112. As discussed below, the planning component 112 may include various components configured to execute tree search techniques, including combinations of inertial-based candidate actions, route-based candidate actions, perturbed candidate actions, etc. The vehicle 102 also may use adaptive learning to predict the future trajectories/states of the vehicle 102 within the scenario 100. The sensors 106, perception component 110 and/or planning component 112 may comprise the hardware and/or software for conducting the operations discussed herein related to trajectory determination and navigation of the autonomous vehicle 102. The various navigational systems described herein may comprise more or fewer components, but the perception component 110 and/or planning component 112 are given as a non-limiting example for the sake of comprehension.

In some examples, the various vehicle navigation systems and functionalities described herein may comprise processor-executable instructions stored in a memory of the computing device(s) 104 and/or accessible thereto, hardware, and/or some combination thereof (e.g., a field-programmable gate array (FPGA), application-specific integrated circuit (ASIC)).

In the example scenario 100, the autonomous vehicle 102 may be parked, or may be performing a parking or unparking maneuver. The autonomous vehicle 102 is shown at a current off-route vehicle state 114. Initially, the autonomous vehicle 102 may receive and/or determine a driving route 116 based on an intended destination of the vehicle. The driving route 116 may include an on-route starting state (e.g., target state 118) and an end state 120 representing a location, velocity, and/or pose, etc., that the autonomous vehicle 102 intends to achieve. The planning component 112 may determine route 116 based at least in part on sensor data, map data, and/or based on an intended destination of a mission (e.g., received from a passenger, from a command center, etc.). As noted above, references to a "state" or "vehicle state" may include geometric state data, such as position (or location) and/or a pose (e.g., position and/or orientation/heading including yaw and steering angle) of a vehicle. Additionally, in some examples, a vehicle state may comprise any combination of a geometric state data for a vehicle, as well as temporal state data for the vehicle (e.g., a velocity, acceleration, yaw, yaw rate, steering angle, steering angle rate, etc.) and/or may include any other status data associated with the vehicle (e.g., current vehicle status data, the status of vehicle signals and operational controls, etc.).

As the autonomous vehicle 102 operates within the environment, it may receive map data of the environment (e.g., from a local or remote map system), and perception data (e.g., sensor data) from the perception component 110. The map data may include, for example, road data determined based on a map of the driving environment and/or localizing the autonomous vehicle 102 within the environment. For instance, the map data may include data associated with any number of road segments (e.g., lane segments) in the driving environment, such as the location (e.g., boundaries), size (e.g., length and width), and shape (e.g., curvature) of the road segment, as well as additional attributes of the road segment such as directionality, speed limit, gradient, road surface, etc.

The autonomous vehicle 102 also may receive sensor data from sensor(s) 106 of the autonomous vehicle 102. The perception component 110 may include one or more ML models and/or other computer-executable instructions for detecting, identifying, segmenting, classifying, and/or tracking objects from sensor data collected from the environment of the autonomous vehicle 102. For example, data generated by the perception component 110 may be used by the autonomous vehicle 102 to localize its position within the driving environment relative to the map data. In some instances, the perception component 110 also may generate drivable surface maps and/or occupancy maps indicating which areas of the environment are drivable and non-drivable surfaces, as well as which locations within the environment are occupied by objects or are free space locations that are unoccupied and in which autonomous vehicle may operate.

Before the autonomous vehicle 102 can navigate the driving route 116 to reach the end state 120, it first may determine and execute an off-route to on-route driving maneuver between its current off-route state 114 and the target state 118 on the driving route. As discussed in the examples herein, the planning component 112 may use the map data and/or perception data, determine candidate trajectories and/or candidate actions, and perform a tree search technique to determine a trajectory 122 for the autonomous vehicle 102 to follow to perform the driving maneuver. The trajectory 122 may continuously and feasibly connect the current off-route vehicle state 114 with the intended target state 118 on the driving route 116. As discussed below in more detail, the planning component 112 may determine the trajectory 122 as an improved or lowest cost (e.g., optimal) trajectory by executing a tree search including determining a combination of inertial-based candidate trajectories and/or route-based candidate trajectories (among others), and evaluating the candidate actions taking into account the future predicted driving scene(s) of the environment, including the predicted trajectories of the autonomous vehicle 102 and the predicted trajectories/states of other agents or objects in the environment. In some cases, the trajectory 122 may represent an optimal and/or lowest-cost trajectory determined by the planning component 112 after evaluating a number of kino-dynamically feasible trajectories (e.g., those that take into consideration various kinematic and dynamic constraints of the vehicle) determined by a tree search technique, based on safety costs (e.g., potential interactions with objects/agents), passenger comfort costs, route progress costs, etc.

In this example, the planning component 112 has determined a single trajectory 122 as the selected control trajectory for the autonomous vehicle 102 to perform the off-route to on-route driving maneuver. In other examples, the planning component 112 may determine any number of alternative low-cost trajectories using search trees and/or the various other techniques described herein. To implement a selected trajectory (e.g., a potential control trajectory), such as trajectory 122, the planning component 112 may generate, substantially simultaneously, a plurality of potential vehicle control actions for controlling the motion of the autonomous vehicle 102 in accordance with a receding horizon technique (e.g., 1 micro-second, half a second, multiple seconds, etc.) based at least in part on the trajectory 122. The planning component 112 may select one or more potential vehicle control actions from which to generate a drive control signal that can be transmitted to drive components of the autonomous vehicle 102, to control the vehicle to traverse the trajectory 122.

Figure 2:
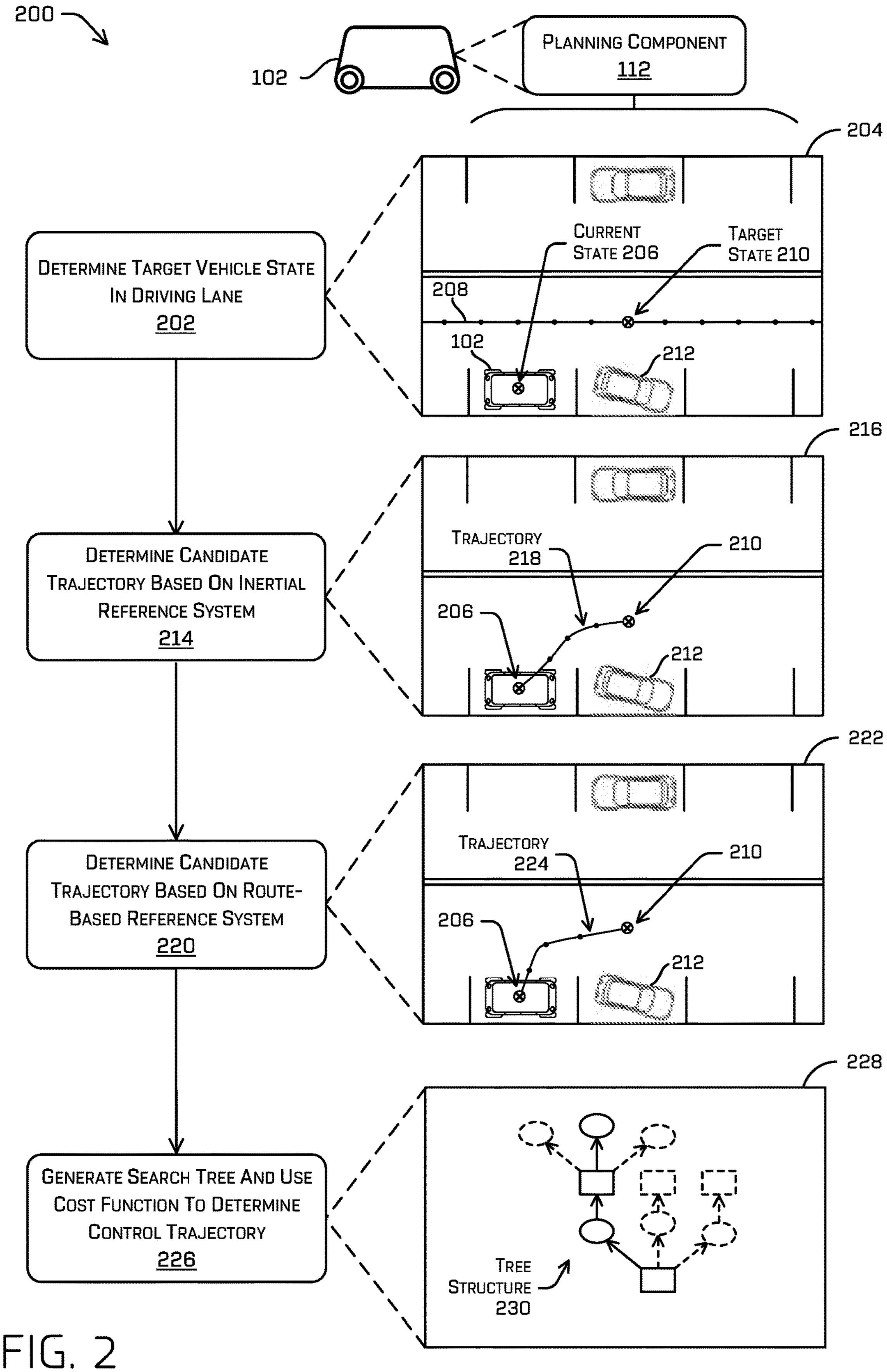
FIG. 2 is a pictorial flow diagram illustrating an example process for determining candidate trajectories and using a decision search tree to control a vehicle to join a driving route, in accordance with one or more examples of the disclosure.

FIG. 2 depicts an example process 200 for performing an off-route to on-route driving maneuver by an autonomous vehicle 102 in a driving environment. As described below, a planning component 112 of the autonomous vehicle may determine a number of candidate trajectories for the vehicle, including route-based candidate trajectories and inertial-based candidate trajectories, and may use a search tree to determine a control trajectory for controlling the vehicle to perform the maneuver to join the driving route.

At operation 202, the planning component 112 may determine a target vehicle state in a lane (or roadway) of the driving route designated for the autonomous vehicle 102. For example, the planning component 112 may initially determine a driving route for the autonomous vehicle based on the current location and the intended destination of the vehicle, as well as based on road network data, map data, traffic data, and the like. After determining the driving route, the planning component 112 may identify a portion of the driving route (e.g., a roadway and/or driving lane) that is closest to and accessible from the current off-route vehicle state. Within the closest portion of the closest accessible roadway, the planning component 112 may determine a particular state in the lane reference trajectory of the roadway, as the target state for the autonomous vehicle 102 to join the driving route. In various examples, the planning component 112 may determine a target state for the autonomous vehicle 102 on a driving route, based on the lateral and/or longitudinal positions of the multiple possible target states in the lane reference trajectory, as well as the current heading of the vehicle relative to the direction of travel of the driving lane, the current velocity of the vehicle, and/or various features or capabilities of the vehicle such as the turning radius and maximum steering angle. For example, the planning component 112 may determine a target state in operation 202 using heuristics based on the distance between current position the autonomous vehicle 102 and the desired driving lane and/or the offset angle between the current orientation of the autonomous vehicle 102 and the directionality of the desired driving lane. In some instances, the planning component 112 may determine a single target state, while in other examples the planning component 112 may determine multiple possible target states for the autonomous vehicle 102 within the desired lane or roadway.

Box 204 shows an example driving environment including an autonomous vehicle 102 that is currently parked (or may be in the process of performing a parking or unparking action) at a current vehicle state 206. As shown in this example, the current vehicle state 206 is an off-route state relative to the driving route designated for the vehicle, which includes the lane reference trajectory 208 of the driving lane adjacent to the vehicle. Based on the relative positions and orientations of the current vehicle state 206 and the states of the lane reference trajectory 208, the planning component 112 may determine target state 210 as the target state for the autonomous vehicle 102 to perform an off-route to on-route driving maneuver. In this example, the driving environment also includes a state vehicle 212, the position and orientation of which may affect both the selection of the target state 210 and/or the possible trajectories available to the autonomous vehicle 102 to navigate to the target state 210.

At operation 214, the planning component 112 may determine a first candidate trajectory between the current off-route vehicle state and the target on-route state based on an inertial reference system. As described above, the planning component 112 may generate a candidate trajectory (or multiple candidate trajectories) in accordance with an inertial-based reference system, using a cubic spline or other mathematical function, and without reference to the lane reference trajectory of the driving lane. In various examples, the planning component 112 may use a cubic spline curve, Bezier curve, a series of clothoids, and/or any other closed-form boundary condition solution, to compute the inertial-based reference trajectory based on the current off-route vehicle state (e.g., the current vehicle position, pose, heading, and velocity) and the target state 210 (e.g., the target vehicle position, pose, heading, and velocity). In some examples, the planning component 112 may use one or more mathematical functions to determine a curve (e.g., a cubic spline curve, a Bezier curve, etc.), and then may apply a velocity profile to the curve (e.g., based on the velocity offset and angular offset between the current vehicle state and target state) to determine the spatiotemporal vehicle states for the candidate trajectory. Box 216 shows the example driving environment including an inertial-based reference trajectory 218 generated by the planning component 112.

At operation 220, the planning component 112 may determine a second candidate trajectory between the current off-route vehicle state and the target on-route state, using a route-based reference system. As described above, the planning component 112 may generate a candidate trajectory (or multiple candidate trajectories) in accordance with a route-based reference system, by retrieving and tracking the lane reference trajectory 208 relative to the current off-route vehicle state. For example, the planning component 112 may determine the spatial offsets (e.g., lateral and longitudinal) and/or velocity offsets between the current vehicle state and one or more nearby states of the lane reference trajectory 208. Based on these differences, the planning component 112 may determine a modification of the lane reference trajectory 208 that may cause the vehicle to converge on the target state 210. Box 222 shows the example driving environment including a route-based reference trajectory 224, different from the inertial-based trajectory 218, generated by the planning component 112.

As noted above, although this example includes only two examples of candidate trajectories (e.g., one inertial-based trajectory 218 and one route-based trajectory 224), in other examples the planning component 112 may generate any number of additional candidate trajectories connecting the current off-route vehicle state 206 and the on-route target state 210. For example, the planning component 112 may determine a candidate trajectory based on one or more previous control trajectories used by the autonomous vehicle 102 during the off-route to on-route driving maneuver. Additionally or alternatively, the planning component 112 may generate any number of perturbed trajectories by using perturbation parameters to laterally shift, velocity scale, and/or steering angle scale any of the other candidate trajectories.

At operation 226, the planning component 112 may generate a search tree and determine a traversal of the tree structure representing a control trajectory for the autonomous vehicle 102 to perform the off-route to on-route driving maneuver between the current vehicle state and the target state. As described below in more detail, the planning component 112 may use a tree search component and/or additional similar search-based components to determine and evaluate the various candidate actions associated with the candidate trajectories. The tree search component may use trajectory optimization techniques, environment data and/or active prediction techniques, as well as cost functions to determine a lowest-cost and/or optimal path (or multiple paths) through a tree structure. For example, box 228 shows the example tree structure 230 representing the physical driving environment between the current off-route state 206 and the on-route target state 210.

Figure 3:
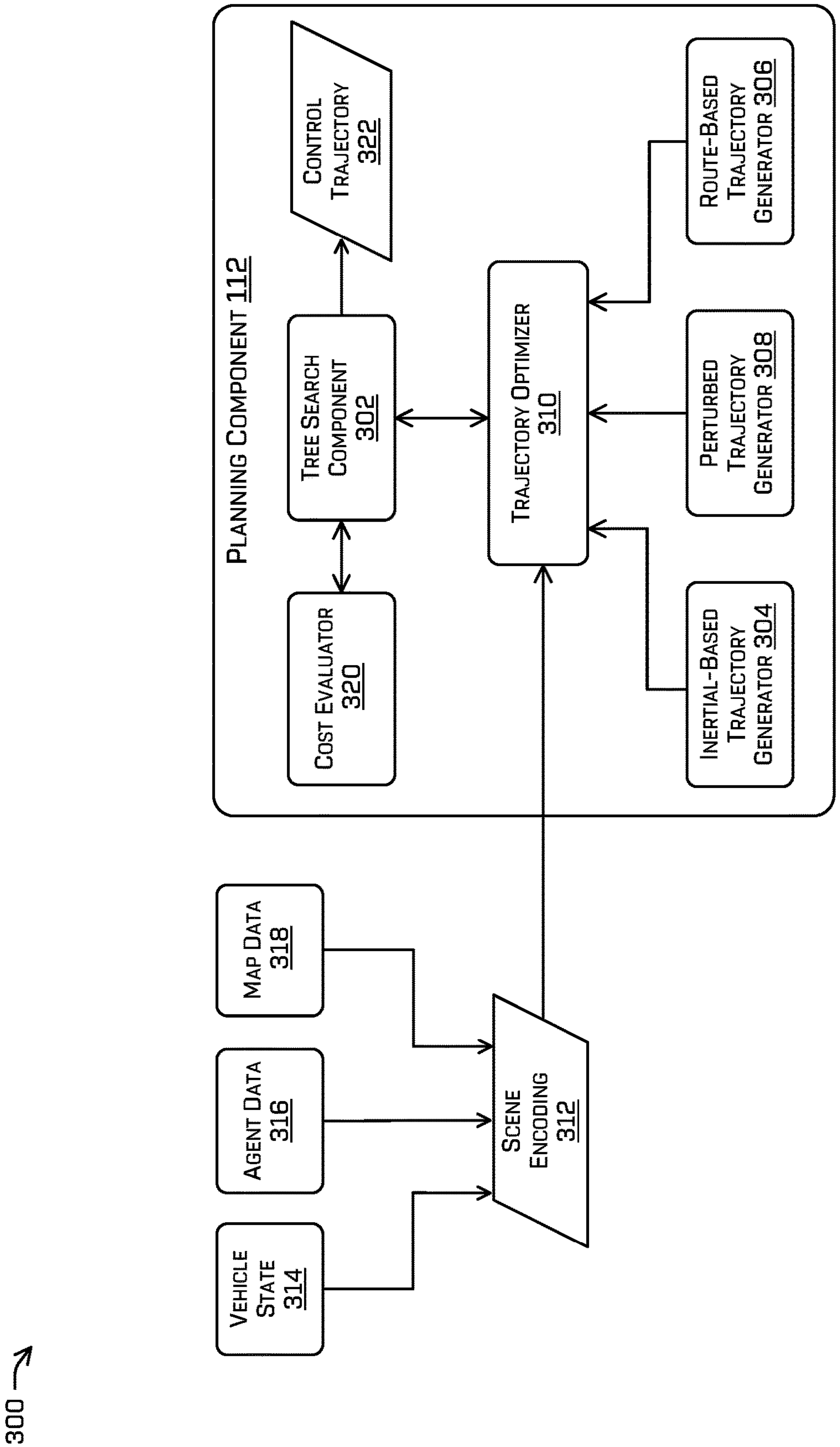
FIG. 3 is a block diagram illustrating an example system for using a planning component to determine a trajectory for a vehicle to join a driving route from an initial off-route vehicle state, in accordance with one or more examples of the disclosure.

FIG. 3 depicts an example system 300 including a planning component 112 of an autonomous vehicle configured to determine a trajectory for the vehicle using a tree search (and/or other search algorithms) including a combination of candidate actions determined based on an inertial-based reference system, a route-based reference system, and perturbed candidate actions, including cost evaluations based on the predicted future states of the vehicle and the environment. As discussed below, at least some of the components of system 300 may be implemented within a planning component 112, such as a tree search component 302, an inertial-based candidate action generator 304, a route-based candidate action generator 306, a perturbed candidate action generator 308, a trajectory optimizer 310, and a cost evaluator 320. However, as described below, one or more of these components may be implemented within separate components within the computing device(s) 104 (e.g., within a prediction component) and/or within separate computing devices/systems (e.g., within a GPU-based computing system).

The system 300 may be implemented to perform on-board trajectory determinations for an autonomous vehicle 102 in real-time driving environments. In some examples, the tree search component 302 may be configured to generate and traverse a search tree (or other data structure) to determine a potential vehicle trajectory as described herein. Additional examples of techniques for generating and traversing search trees to determine trajectories for controlling the motion of autonomous vehicles, based on determining a candidate action and predicting a future state based on the candidate action can be found, for example, in U.S. patent application Ser. No. 17/394,334, filed on Aug. 4, 2021, and titled, "Vehicle Trajectory Control Using A Tree Search," which is incorporated by reference herein in its entirety for all purposes. Based on the tree search techniques described herein, the tree search component 302 may determine one or more paths (or traversals) through the nodes of the tree structure representing the driving route. In some cases, the tree search component 302 may evaluate multiple different paths through the tree to identify one or more low-cost paths representing possible trajectories for the vehicle to follow.

The inertial-based candidate action generator 304 may determine candidate trajectories, including candidate actions at the various states in the trajectory. As noted above, the inertial-based candidate action generator 304 may determine one or more trajectories between a current vehicle state (e.g., an off-route state) and a target on-route state designated for the vehicle. Inertial-based candidate trajectories and actions may be generated by the inertial-based candidate action generator 304 to move the vehicle in a kino-dynamically feasible way, without reference to the structure of the driving route, from the current off-route state to the target state. To generate candidate trajectories and/or actions, the inertial-based candidate action generator 304 may use mathematical functions, including but limited to cubic spline curve, a Bezier curve, a series of clothoids, and/or any other closed-form boundary condition solution. Inputs to the mathematical functions may include the lateral and longitudinal distances of the target state relative to the current vehicle state, the lane directionality of the target state relative to the heading of the current vehicle state, and/or vehicle capabilities such as turning radius and maximum steering angle.

The route-based candidate action generator 306 also may determine one or more candidate trajectories and/or candidate actions, between the current vehicle state (e.g., an off-route state) and a target on-route state designated for the vehicle. Unlike inertial-based candidate trajectories and actions, route-based candidate trajectories and actions may be based on the reference trajectory of the driving lane on which the target state is located. To determine a route-based candidate trajectory/action, the route-based candidate action generator 306 may retrieve and "track" the lane reference trajectory relative to the current off-route vehicle state. For example, the route-based candidate action generator 306 may determine a lateral offset and/or velocity difference between the current vehicle state and corresponding state (e.g., closest state spatially) in the driving lane reference trajectory, and may modify the velocity, steering angle, of the lane reference trajectory states to generate a route-based reference trajectory that may cause the vehicle to converge on the target state.

The perturbed candidate action generator 308 also may determine one or more additional candidate trajectories and/or candidate actions, between the current vehicle state (e.g., an off-route state) and a target on-route state designated for the vehicle. In this example, the perturbed candidate action generator 308 may generate additional candidate trajectories by modifying other candidate trajectories based on perturbation parameters. The perturbation parameters may include, for example, a lateral shifting parameter configured to laterally shift a candidate trajectory by a distance amount (e.g., 0.5 meters, 1 meter, 2 meters, etc.) in either lateral direction. A velocity scaling parameter may be configured to change the velocity of a candidate trajectory by a velocity amount (e.g., +/−1 MPH, 2 MPH, 5 MPH, etc.) or a percentage (e.g., =/−1%, 5%, 10%, etc.). A steering angle parameter configured to change the steering angle of a candidate trajectory by an angular distance amount (e.g., +/−1 degree, 2 degrees, 5 degrees, etc.). The perturbed candidate action generator 308 may generate any number of candidate trajectories by perturbing (or modifying) a different candidate trajectory (e.g., an inertial-based candidate trajectory, a route-based candidate trajectory, and/or a previous control trajectory of the vehicle, etc.), using any combination of perturbation parameters (e.g., velocity, steering angle, lateral shift, etc.) and/or any number of different perturbation magnitudes for the perturbation parameters.

As shown in this example, each of the inertial-based candidate action generator 304, the route-based candidate action generator 306, and the perturbed candidate action generator 308 may provide candidate trajectories to the trajectory optimizer 310. The trajectory optimizer 310 may be configured to optimize and/or filter the candidate trajectories based on the current environment. For instance, the trajectory optimizer 310 may modify each candidate trajectory based on the map data and/or various agents and objects detected in the driving environment. In some cases, a candidate trajectory that intersects (e.g., overlaps) with the position of a static object in the environment may be filtered out by the trajectory optimizer 310. Additional candidate trajectories may be optimized based on the current state of the driving environment, including the current vehicle state, the state of the vehicle relative to the map data, and/or the static and dynamic objects perceived by the vehicle's sensors. For each candidate trajectory, the trajectory optimizer 310 may modify the trajectory to output a kino-dynamically feasible and static-aware (e.g., not intersecting with a static object) trajectory, that starts at the current vehicle state and ends at the on-route target state.

In some examples, one or more of the candidate action generators 304-308, and/or the trajectory optimizer 310 may use an active prediction model to determine one or more ML prediction-based candidate actions. Such an active prediction model may be implemented based at least in part on the various techniques and systems described in U.S. patent application Ser. No. 17/351,641, filed Jun. 18, 2021, and entitled, "Active Prediction Based On Object Trajectories," the entire contents of which are incorporated herein by reference in their entirety for all purposes.

The trajectory optimizer 310 may receive as inputs the current vehicle state (e.g., including the current trajectory) of the autonomous vehicle 102, as well as a representation of the driving environment in which the vehicle is operating. In this example, the trajectory optimizer 310 may receive a scene encoding 312 representing the current environment, based at least in part on current vehicle state data 314 (which may include the designed driving route, intended destination, and/or driving preferences of the autonomous vehicle 102), agent data 316 based on the perception component 110 and/or data captured by the vehicle sensors of static and/or dynamic agents in the environment, and map data 318 from a map component of the vehicle. For instance, using the perception component 110 based on data captured by the vehicle sensors 106, a driving environment scene encoder may generate the scene encoding 312 (e.g., a scene embedding) which may be a vector unique to the particular driving scene and scenario, representing the driving environment at a particular time. In some cases, a driving environment scene encoder may use a neural network architecture trained to output scene encodings based on inputs including a combination of map data and data perceived by the vehicle in the environment. Examples of various techniques for determining scene encodings and/or other representations of an environment can be found, for example, in U.S. patent application Ser. No. 17/855,088, filed Jun. 30, 2022, and entitled, "Machine-Learned Component For Vehicle Trajectory Generation," the entire contents of which are incorporated herein by reference in their entirety for all purposes.

In some examples, the trajectory optimizer 310 may determine predicted future trajectories (and/or other predicted vehicle state data) for the autonomous vehicle 102 and any other agents/objects in the environment, and/or predicted future states for the environment as a whole. In some examples, the trajectory optimizer 310 may output a predicted future scene encoding, having a similar or identical encoding format as that of the current scene encoding 312. As noted above, trajectory optimization also may include recurrently determining sequences of predicted vehicle and agent trajectories, and/or scene encodings.

The cost evaluator 320 may receive the determined costs associated with the various candidate actions determined by the various candidate action generators 304-308. In some instances, the cost evaluator 320 may use an active prediction model and/or other ML-based prediction models to predict future trajectories/states for the autonomous vehicle 102 based on a candidate action, and/or predicted future environment states based on the candidate action. The cost evaluator 320 then may evaluate the predicted trajectories and/or environments to determine sets of associated costs with the candidate trajectory. Costs may be determined by evaluating individual the predicted trajectories/states for the autonomous vehicle 102 based on the candidate action, and/or the predicted trajectories/states for other agents in the environment. In some examples, to execute more quickly and save computational resources, the cost evaluator 320 need not (but may) re-execute an active prediction model in full for each of the candidate actions. For instance, to evaluate the cost of a candidate action, the cost evaluator 320 may implement an assumption that the autonomous vehicle 102 may continue performing the same candidate action throughout the driving maneuver (e.g., until the target state is reached and/or an end time step is reached).

In addition to or as an alternative to using an active prediction model for computing costs associated with a candidate action, the cost evaluator 320 also may include various heuristics and/or ML-based components configured to detect and compute costs associated with potentially unsafe, illegal, or risky driving maneuvers. Such costs, which may be referred to as safety costs, may include speeding, driving out of a lane or crossing a double-yellow line, stopping in a crosswalk, braking, accelerating, or steering too sharply based on the road/lane configuration and the current driving conditions, etc. Additional costs determined by the cost evaluator 320 may include passenger comfort costs (e.g., based on sharp turns, unnecessary turns, bumps, jerkiness, or inconsistency of the trajectory, etc.), and route progress costs (e.g., based on longitudinal distance obtained, vehicle velocity, and/or time-to-go costs between the current vehicle position and the route end state). For these costs and the various other costs described herein, the cost evaluator 320 may be configured to evaluate the trajectories output by an active prediction model, including the predicted trajectory of the autonomous vehicle 102 and/or of the other agents in the environment, and to compute cost values associated with the predicted trajectories, individually or in combination.

In addition to costs based on evaluating individual trajectories, the cost evaluator 320 also may determine costs by analyzing multiple predicted trajectories together (and/or the predicted environment as a whole) to identify potential interactions between the autonomous vehicle 102 and one or more additional agents or other objects in the environment. For instance, the cost evaluator 320 may compute cost values based on determining potential intersecting points between the trajectories of the autonomous vehicle 102 (e.g., assuming the autonomous vehicle 102 continues to perform the candidate action) and an agent (or multiple agents) at any future time in the predicted driving scene. Such interaction costs may include costs based on detecting a potential collision or near-miss collision, a failure to yield and/or an aggressive driving cost of the autonomous vehicle 102 relative to other vehicles, pedestrians, bicycles, etc. In some examples, the cost evaluator 320 may determine interaction costs based on potential intersecting points between multiple agents that might not include the autonomous vehicle 102.

In various examples, the cost evaluator 320 may evaluate candidate actions individually (e.g., based on costs associated with individual trajectories and/or groups of potentially interacting trajectories) and/or the driving scene/environment as a whole, at multiple predicted future time steps. As noted above, the cost evaluator 320 may use an active prediction model to determine predicted trajectories and/or predicted driving scene encodings over a time period (e.g., 2 seconds, 5 seconds, 10 seconds, etc.) that may include any number of discreet time steps between the current state and target state. The cost evaluator 320 may evaluate the trajectories/driving scene and determine costs associated with individual discreet time steps, and may aggregate the various costs (e.g., including both individual trajectory costs and vehicle-agent interaction costs) over the discreet time steps for the entirety of the trajectory of the autonomous vehicle 102. In some examples, the cost evaluator 320 may up-weight the costs determined based on earlier time steps in the trajectory, which may be more likely to occur, and down-weight the costs based on later time steps in the trajectory, which may be less likely to occur.

Additionally, in some cases, the cost evaluator 320 may compute costs associated with multiple alternative future predictions. For instance, the cost evaluator 320 may separate compute set of costs for different possible trajectories output by an active prediction model, in which the different possible trajectories are associated with the same candidate action. To determine an overall cost associated with the candidate action, the cost evaluator 320 may aggregate and/or weight costs from the alternative predicted sets of trajectories/states, using the respective confidence values and/or likelihoods of the sets of trajectories to scale/weight the overall cost computation.

After computing a cost value or set of cost values associated with a particular candidate action, the cost evaluator 320 may provide the cost(s) back to the tree search component 302, which may select one or more of the candidate actions from a node in the tree for further exploration. As described above, the tree search component 302 may perform these techniques iteratively, including determining a new node representing a vehicle state, determining candidate actions for the vehicle state, evaluating the candidate actions using cost functions via the cost evaluator 320, and generating the tree by creating one or more additional nodes based on the selected candidate actions. Upon reaching the intended end state for the driving route, the tree search component 302 may determine one or more paths of nodes through the tree structure representing one or more possible trajectories for the autonomous vehicle 102 to follow through the driving environment. The tree search component 302 may determine a lowest-cost and/or optimal path, or multiple paths, based on the degree to which the search space of possible trajectories was explored using the determined candidate actions and/or based on the cost metrics/thresholds used by the tree search component 302 to determine optimal or lowest-cost trajectories. When the tree search component 302 has determined a possible solution trajectory (e.g., an optimal or lowest-cost trajectory through the tree structure) based on the node costs, the trajectory may be selected as a control trajectory 322 that may be followed by the autonomous vehicle 102 to reach the target on-route state.

FIGS. 4A-4F illustrate several examples of determining and selecting candidate trajectories for controlling a vehicle from a current off-route vehicle state to a target vehicle state on a driving route. As shown in these examples, the planning component 112 may use various different techniques to generate a dense set of multiple candidate trajectories to transition the vehicle from the current off-route state to a target on-route state. The various candidate trajectories may be optimized and evaluated in a similar manner using a trajectory optimizer and decision search tree techniques, to determine a control trajectory for the autonomous vehicle 102 to follow to perform the off-route to on-route driving maneuver.

Figure 4A:
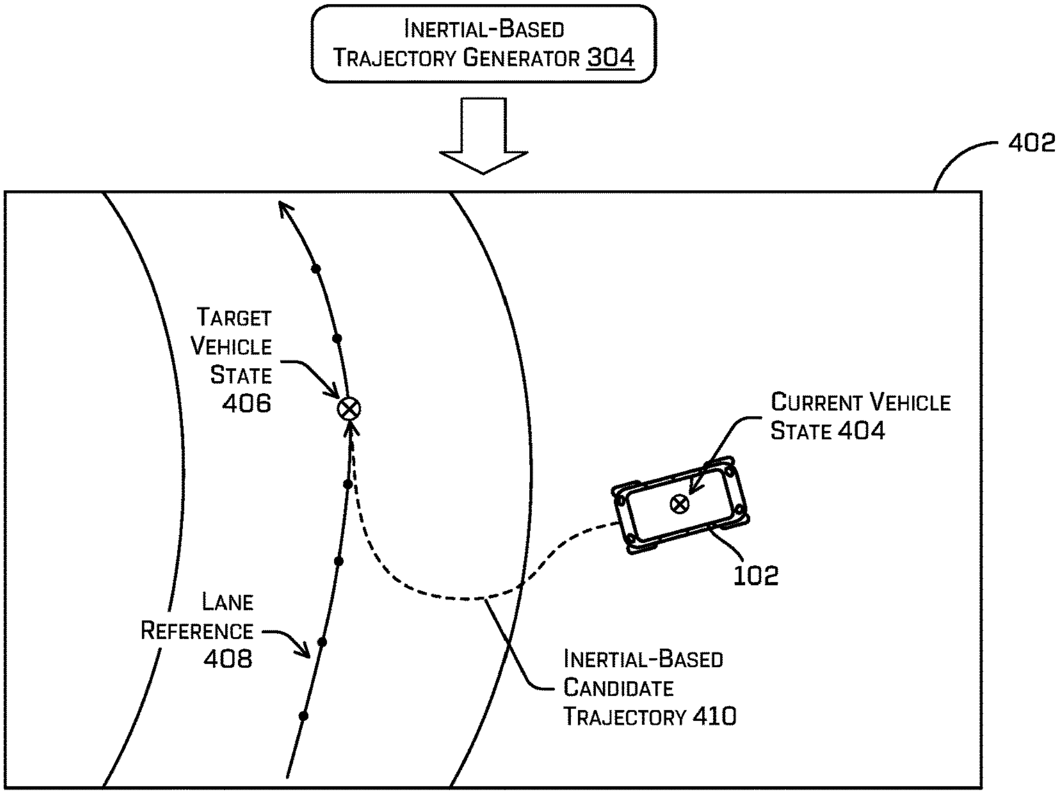
FIGS. 4A-4F illustrate examples of determining and selecting candidate trajectories for controlling a vehicle from an off-route vehicle state to a target vehicle state on a driving route, in accordance with one or more examples of the disclosure.

FIG. 4A depicts a driving environment 402 including an autonomous vehicle 102 at a current off-route vehicle state 404. For example, the autonomous vehicle 102 may be parked or performing parking or unparking action, pulling off of or onto the road, reversing or performing other uncommon driving maneuvers, etc. The autonomous vehicle 102 also may be driving in unstructured environments (e.g., environments without a predetermined route structure including lane reference trajectories) such as a parking lot, driveway, or construction zones. In this example, based on the designated driving route for the autonomous vehicle 102, the planning component 112 has determined a target vehicle state 406 on the lane reference trajectory 408 for the driving lane.

Figure 4B:
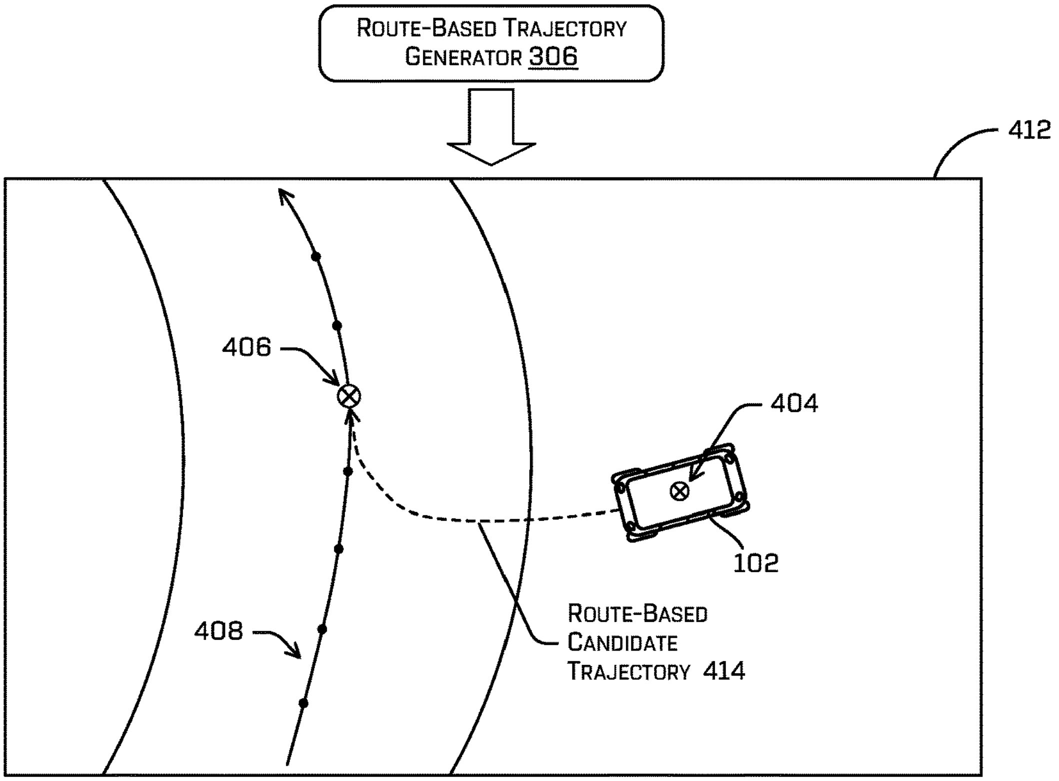
Figure 4C:
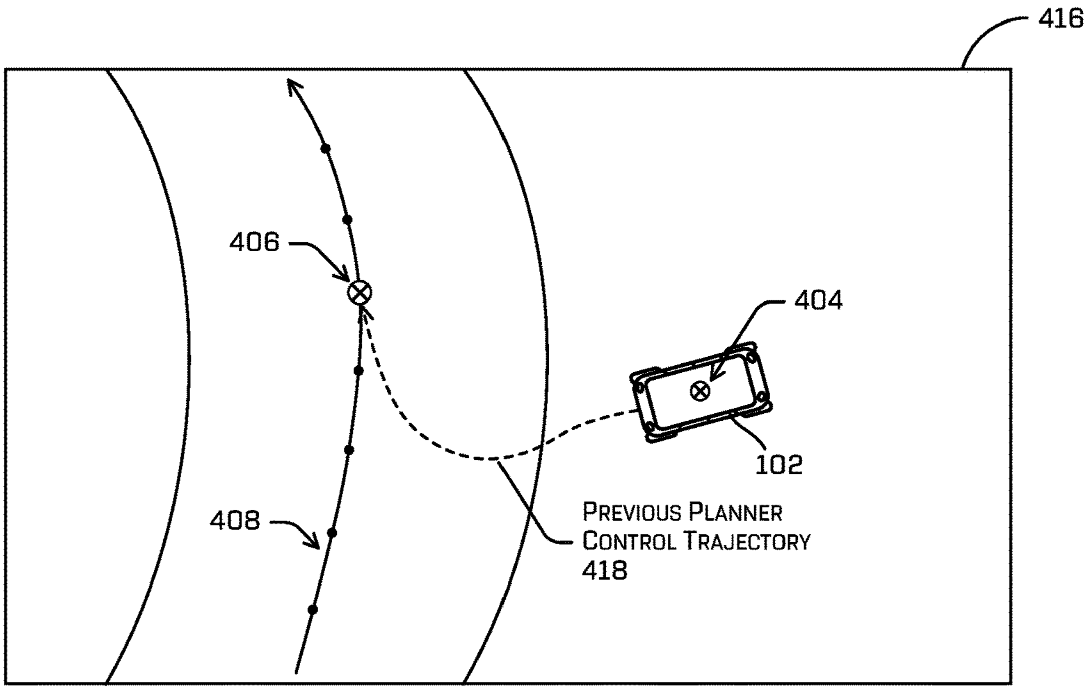
Figure 4D:
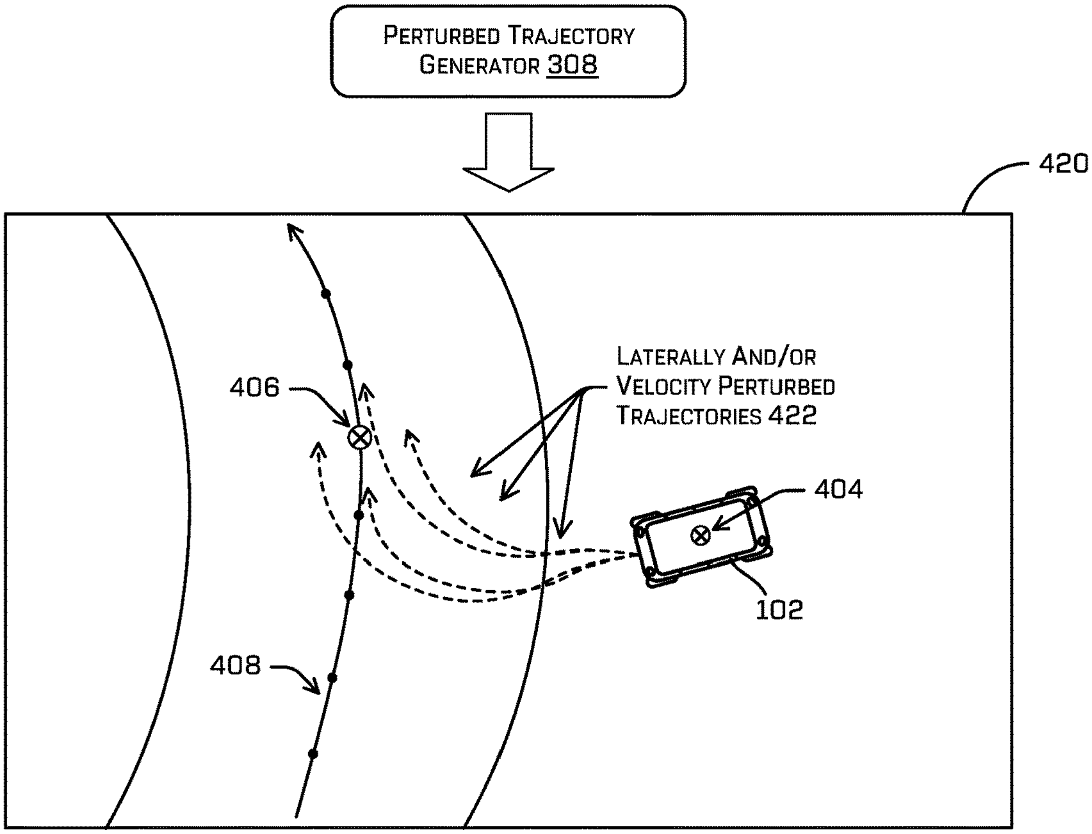

Based on the current off-route vehicle state 404 and the target on-route vehicle state 406, the planning component 112 may determine various candidate trajectories to transition the autonomous vehicle 102 onto the driving route at the target state 406. In FIG. 4A, the planning component 112 uses inertial-based candidate action generator 304 to generate an inertial-based candidate trajectory 410. As described above, the inertial-based candidate action generator 304 may generate the candidate trajectory 410 using a cubic spline or other mathematical function, without reference to the lane reference trajectory 408 of the driving lane. In FIG. 4B, in the driving environment 412, the planning component 112 uses a route-based candidate action generator 306 to generate a separate route-based candidate trajectory 414. As described above, the route-based candidate action generator 306 may generate the candidate trajectory 414 by using a controller to track the current vehicle state 404 onto the lane reference trajectory 408. In FIG. 4C, in the driving environment 416, the planning component 112 retrieves and uses a previous control trajectory 418 of the autonomous vehicle 102 (e.g., from a previous planner processing cycle) as a candidate trajectory in the current planner processing cycle. In FIG. 4D, in the driving environment 420, the planning component 112 uses a perturbed candidate action generator 308 to generate a set of multiple perturbed candidate trajectories 422. Each of perturbed candidate trajectories 422 may be based on a previously generated candidate trajectory (e.g., trajectory 410, 414, or 418, etc.) and may be laterally shifted and/or velocity scaled, based on one or more perturbation parameters, to generate a perturbed trajectory.

Figure 4E:
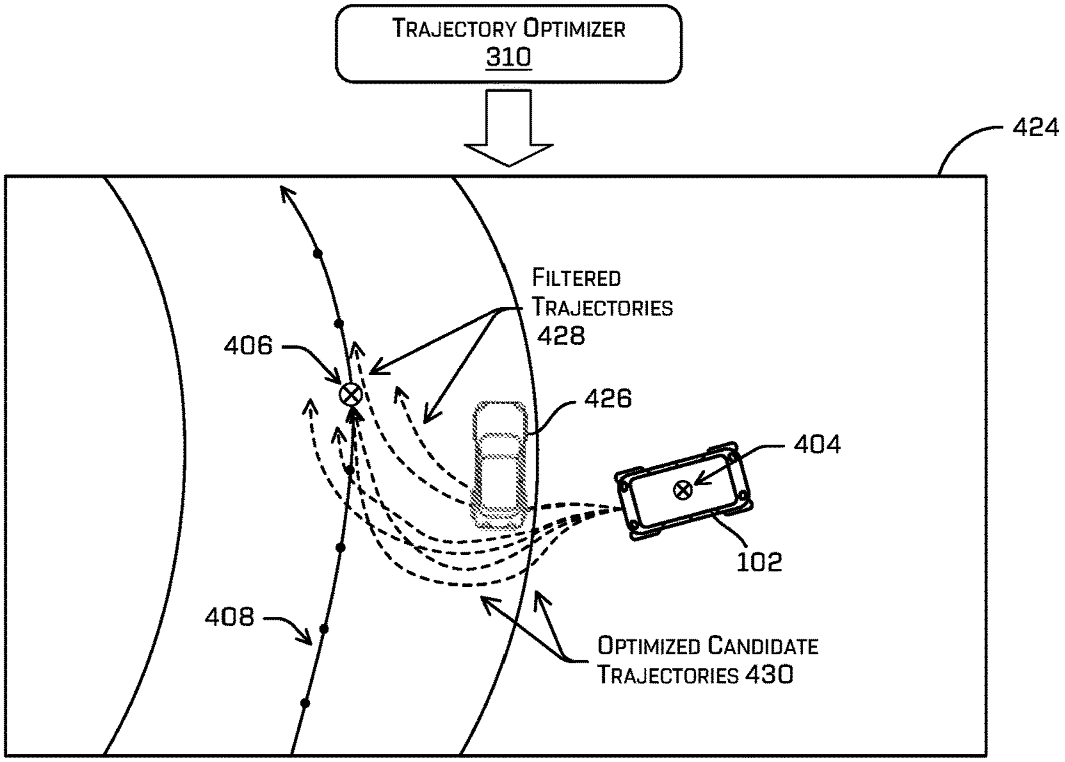

In FIG. 4E, in the driving environment 424, the planning component 112 may use the trajectory optimizer 310 to modify and/or filter the various candidate trajectories generated in FIGS. 4A-4D. As noted above, the trajectory optimizer 310 may use the current state of the environment and/or any dynamic or static agents perceived by the sensors of the autonomous vehicle 102, to modify and/or exclude candidate trajectories. In this example, a first subset 428 of the candidate trajectories may be filtered out by the trajectory optimizer 310 based on determining that the candidate trajectories are overlaps the position of a static object 426 detected in the environment. However, a second subset 430 of the candidate trajectories that do not overlap the static object 426 are retained by trajectory optimizer 310. In this example, the second subset 430 of candidate trajectories may be optimized based on the current driving scene and environment, and provided as the input candidate actions to the tree search component 302.

Figure 4F:
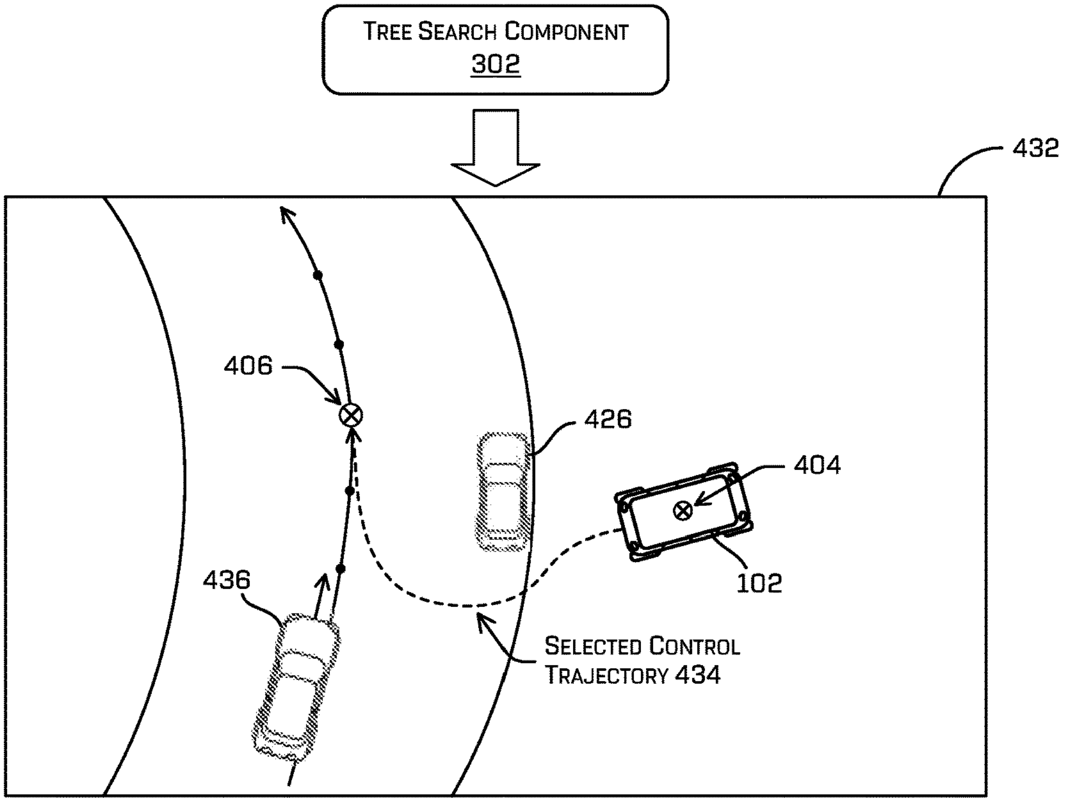

In FIG. 4F, in the driving environment 432, the planning component 112 may use the tree search component 302 to evaluate the retained second subset 430 of candidate trajectories, and to determine a control trajectory 322 to output to control the vehicle from the current off-route state 404 to the target on-route state 408. As described above, the output trajectory determined by the tree search component 302 may represent an optimal and/or lowest-cost traversal of the tree structure, using the decision tree search techniques described herein.

Figure 5A:
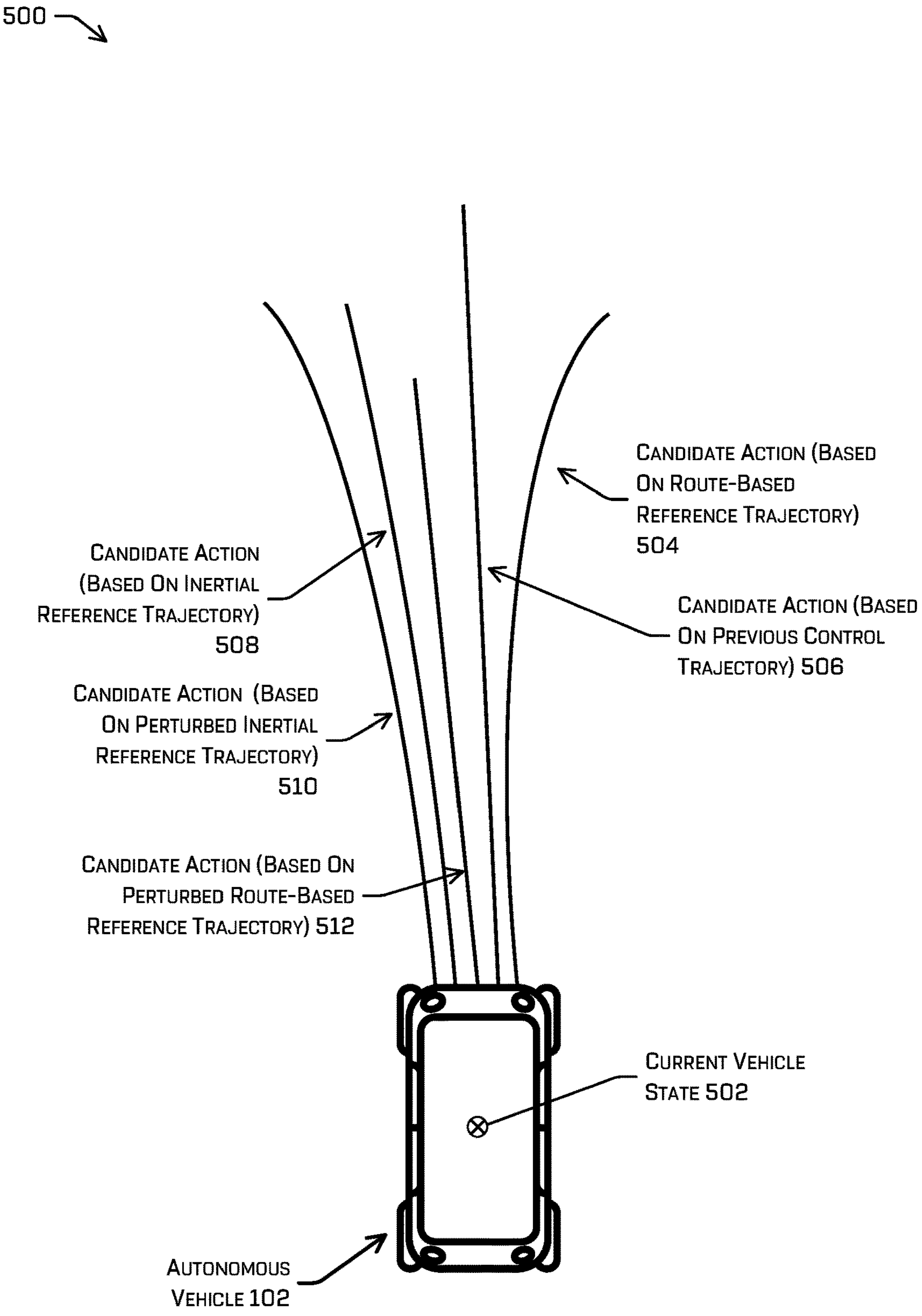
FIG. 5A illustrates an example representation of a set of candidate actions generated for a node in a tree search, in accordance with one or more examples of the disclosure.

FIG. 5A illustrates an example representation 500 of a set of candidate actions for an autonomous vehicle 102. In this example, the autonomous vehicle 102 is depicted at a current vehicle state 502, which may represent a node in a tree structure used to determine a trajectory between an off-route start state and an on-route end state. The vehicle state 502 may include a set of parameters associated with a state of the autonomous vehicle 102, including the vehicle's position, pose, velocity, steering angle, and/or yaw rate. In some examples, the vehicle state 502 may represent a current state of the autonomous vehicle 102 (e.g., the current state 114) and may correspond to the root node of the tree search. However, in other examples, the vehicle state 502 need not be the current state of the autonomous vehicle 102, but may represent a predicted future state of the vehicle, corresponding to a non-root node further down the tree structure toward the end state of the driving route.

In this example, candidate actions 504-512 are shown representing different actions (e.g., trajectories) that the vehicle may perform from the vehicle state 502. Each of the candidate actions 504-512 may represent a kino-dynamically feasible trajectory that the autonomous vehicle 102 is capable of performing. For instance, candidate actions 504-512 may be associated with a vehicle speed, velocity, steering angle, and/or other vehicle trajectory parameters. In some cases, a candidate action also may include commands for activating emitters of the vehicle (e.g., turn signal, headlights, horn, speaker, etc.) and/or any other vehicle control command. The candidate actions 504-512 are depicted graphically in this example, each representing a trajectory that the autonomous vehicle 102 may follow from the vehicle state 502. In some examples, candidate actions 504-512 may be generated and stored as absolute parameter values (e.g., velocities, steering angles, etc.) while in other cases the generated and stored relative to the parameters of the vehicle state 502 (e.g., a velocity difference, a steering angle difference, etc.).

As described above, each of the candidate actions 504-512 can be used by the planning component 112 to determine a future state of the autonomous vehicle 102 that may result from the vehicle performing the candidate action. In other examples, the planning component 112 may use similar or identical techniques to generate a number of candidate vehicle states (e.g., rather than candidate actions). Each of the candidate actions 504-512 may include general driving commands and/or fine instructions for performing driving maneuvers, such as velocities or velocity changes, steering angles or steering angle changes, etc.

In this example, candidate action 504 is a candidate action determined by the planning component 112 based on a route-based reference trajectory. As described above, the candidate action 504 may represent an action determined by a controller of the planning component to track the lane reference trajectory the includes the target state. The controller may determine the candidate action 504 as an action (e.g., velocity, steering angle, etc.) that may attempt to converge the vehicle onto the lane reference trajectory at the target state. In this example, candidate action 506 is a previous control trajectory determined by the planning component 112 for controlling the vehicle at a previous time (e.g., a previous processing cycle) during the maneuver. Candidate action 508 is a candidate action determined by the planning component 112 as an inertial-based reference trajectory. As described above, the candidate action 508 may be determined using a cubic spline or other mathematical function, to move the vehicle in a kino-dynamically feasible way (e.g., without reference to the structure of the driving route) between the current off-route state and the target on-route state. Candidate actions 510 and 512 represent perturbed (or modified) candidate actions, generated by applying one or more perturbation parameters (e.g., a lateral shifting parameter and/or a velocity scaling parameter) to the inertial-based candidate action 508, and the route-based candidate action 504, respectively.

As noted above, although this example depicts a set of candidate actions 504-512 that includes five separate candidate actions based on five different techniques for generating candidate trajectories, in other examples, the planning component 112 may determine any number of candidate actions and any number of kino-dynamically candidate trajectories determined by the planning component.

Figure 5B:
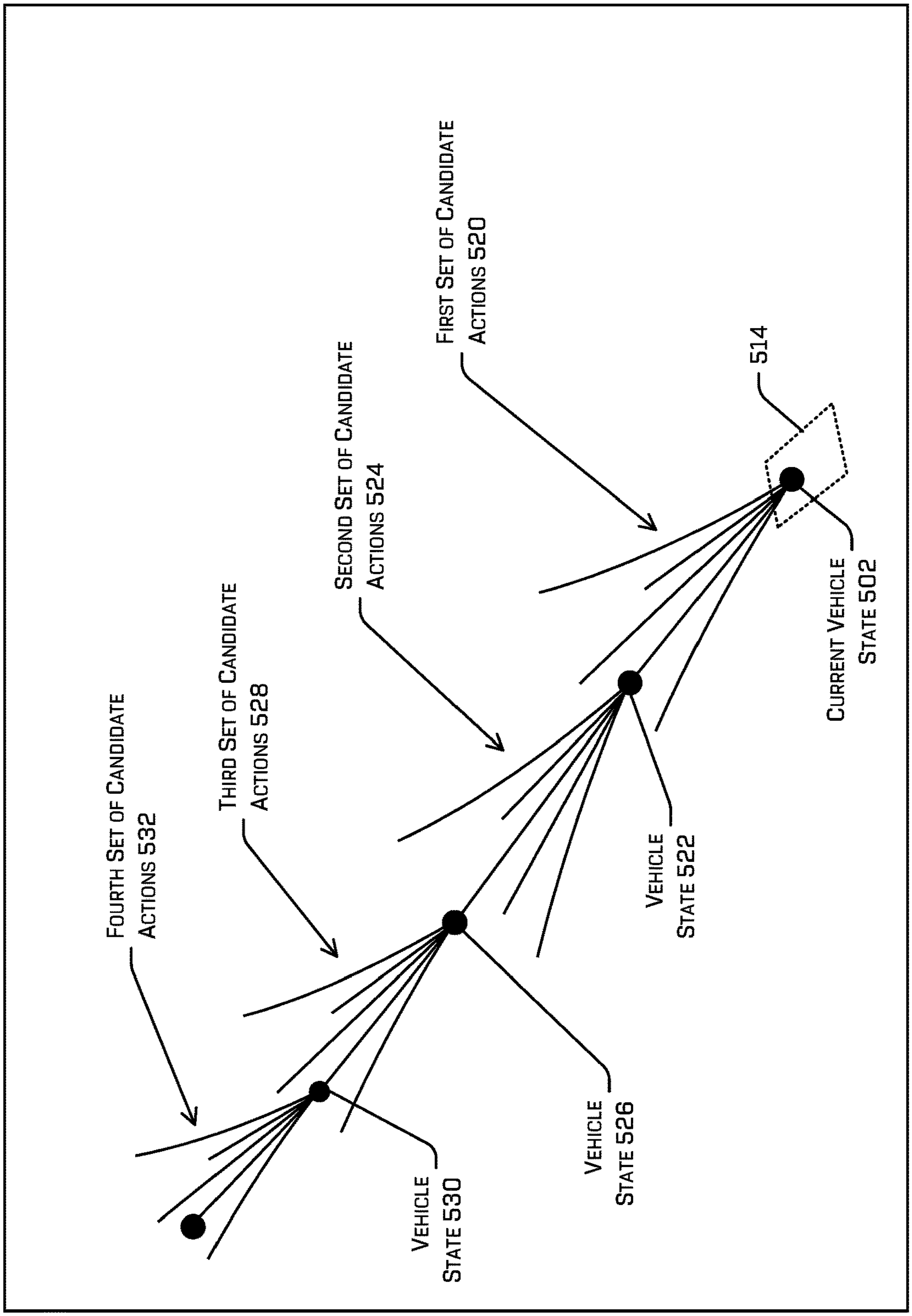
FIG. 5B illustrates an example representation of multiple sets of candidate actions associated with different nodes in a tree search to determine a trajectory, in accordance with one or more examples of the disclosure.

FIG. 5B illustrates a representation 500 of four different sets of candidate actions (e.g., trajectories in the depicted example) generated at four different nodes representing vehicle states at four different action layers of a tree search. Each vehicle state and each set of candidate actions in this example may be similar or identical, respectively, to the vehicle state 502 and the set of candidate actions 504-512 described above. In this example, FIG. 5B depicts the vehicle state 502, which may be a current off-route vehicle state of the vehicle, corresponding to a root node in a tree search. The space occupied by the autonomous vehicle 102 at the vehicle state 502 is represented as a dashed line 514.

The first set of candidate actions 520 may be determined by the planning component 112 based at least in part on the vehicle state 502, including the vehicle position, pose, velocity, acceleration, steering rate, etc., of the autonomous vehicle 102, as well as the environment state data associated with the root node. As in the previous example, the length of a candidate action may indicate a velocity and/or acceleration associated with the candidate action.

The second set of candidate actions 524 may be generated based at least in part on selecting a first candidate action of the first set of candidate actions 520 for exploration, and based at least in part on the vehicle state 522 (e.g., position, pose, velocity, steering rate, etc.), that the selected first candidate action would cause the vehicle to perform upon concluding execution of the first candidate action within the current state of the environment. Although this example illustrates the selection of a single vehicle state 522 corresponding to a single candidate action from a candidate trajectory, in other examples the tree search technique may include selecting multiple candidate actions from multiple candidate trajectories at any or all of the branching points (e.g., vehicle state 522, vehicle state 526, vehicle state 530, etc.). Further, in some examples the tree search technique may include following and expanding on multiple branches corresponding not only to different candidate trajectories/actions, but also to different possible future states of the driving environment itself (e.g., different possible object positions, agent trajectories, etc.).

In some cases, the vehicle state 522 may represent a subsequent vehicle state based on following one of the inertial-based candidate trajectories, while in other cases the vehicle state 522 may represent a subsequent vehicle state based on following one of the route-based candidate trajectories, perturbed candidate trajectories, etc. When evaluating the first set of candidate actions 520 and/or when selecting the vehicle state 522 for further exploration in the tree search, the planning component 112 may generate a search tree node representing the selected vehicle state 522. In some examples, the second set of candidate actions 524 may include an action (or multiple actions) associated with each of the candidate trajectories determined (as described above) and provided as input to the tree search (e.g., an inertial-based reference trajectory, a route-based reference trajectory, one or more perturbed (or modified) candidate trajectories, etc.). For instance, the second set of candidate actions 524 may include the actions within each of the candidate trajectories for the corresponding trajectory segment (e.g., time step) in the respective trajectories.

The third set of candidate actions 528 may similarly be based at least in part on selection of a second candidate action from among the second set of candidate actions 524, based at least in part on the vehicle state 526 that the selected second candidate action would cause the vehicle to perform upon concluding execution of the second candidate action within the subsequent state of the environment associated with vehicle state 526 (e.g., the future predicted environment state, vehicle state, agent positions, etc., at the time of vehicle state 526). When evaluating the second set of candidate actions 524 and/or when selecting the vehicle state 526 for further exploration in the tree search, the planning component 112 may generate a search tree node representing the selected vehicle state 526. Similarly, the fourth set of candidate actions 523 may be based at least in part on selection of a third candidate action from among the third set of candidate actions 528, based at least in part on the vehicle state 530 that the selected third candidate action would cause the vehicle to perform upon concluding execution of the third candidate action within the state of the environment associated with vehicle state 530. When evaluating the third set of candidate actions 528 and/or when selecting the vehicle state 530 for further exploration in the tree search, the planning component 112 may generate a search tree node representing the selected vehicle state 530, and so on.

In some examples, the representation 500 may be a visual depiction of a determinized sparse partially observable tree (DESPOT) determined according to a partially observable Markov decision process (POMDP).

Figure 6A:
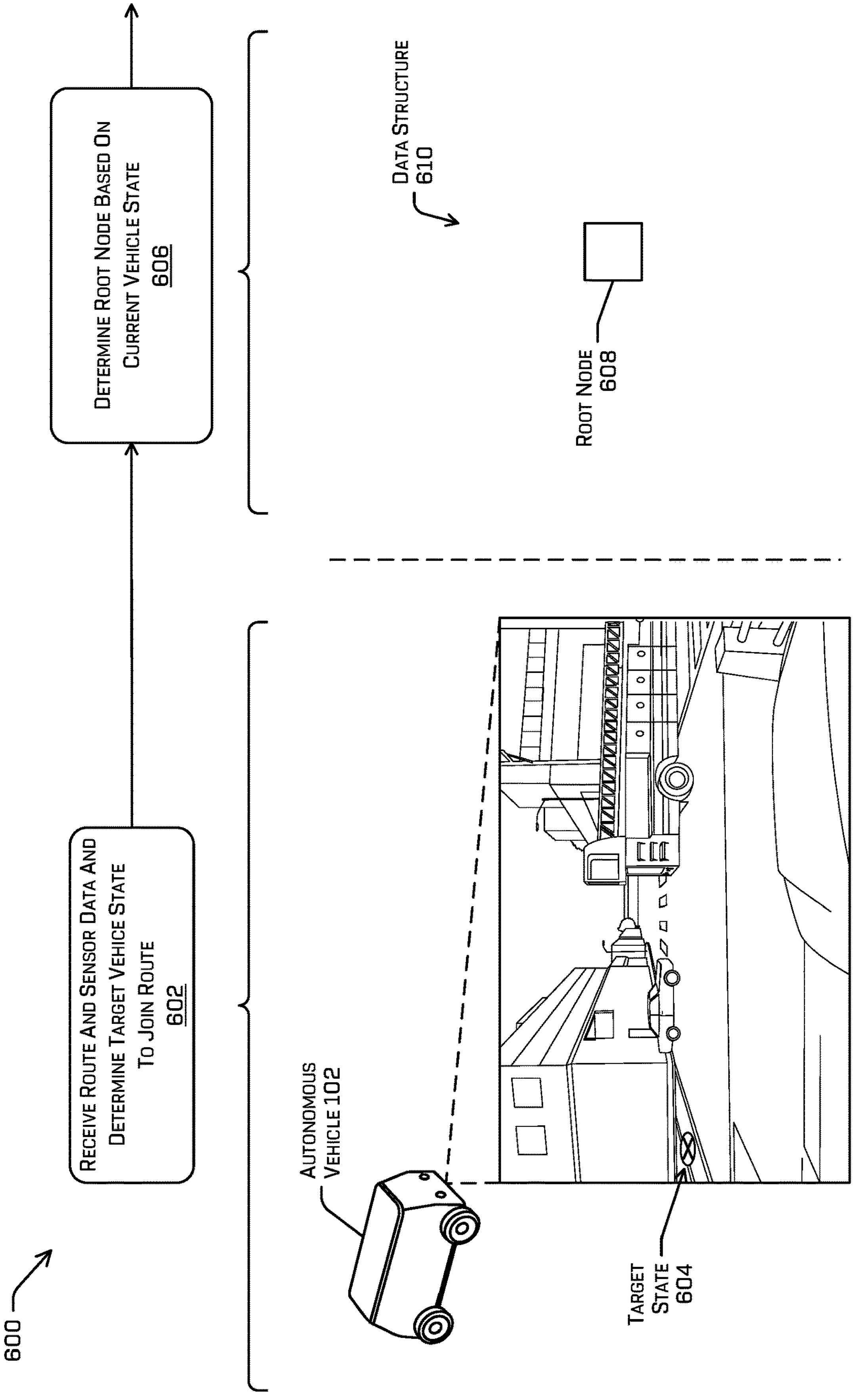
FIGS. 6A-6C illustrate a pictorial flow diagram of an example process for generating a trajectory for controlling a vehicle from an off-route vehicle state to a target vehicle state on a driving route, including evaluating various candidate actions based on inertial-based and/or route-based reference systems, in accordance with one or more examples of the disclosure.
Figure 6B:
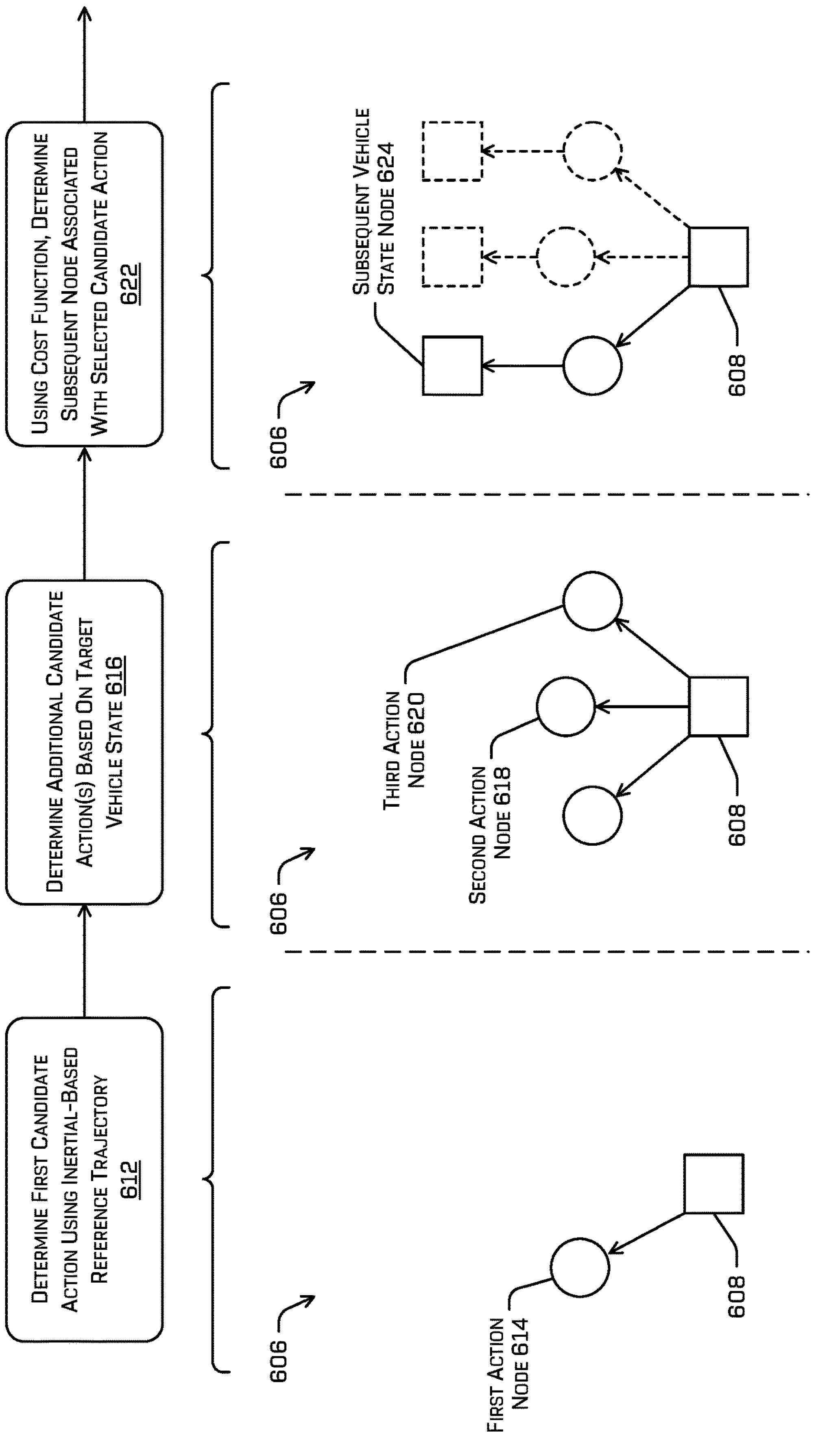
Figure 6C:
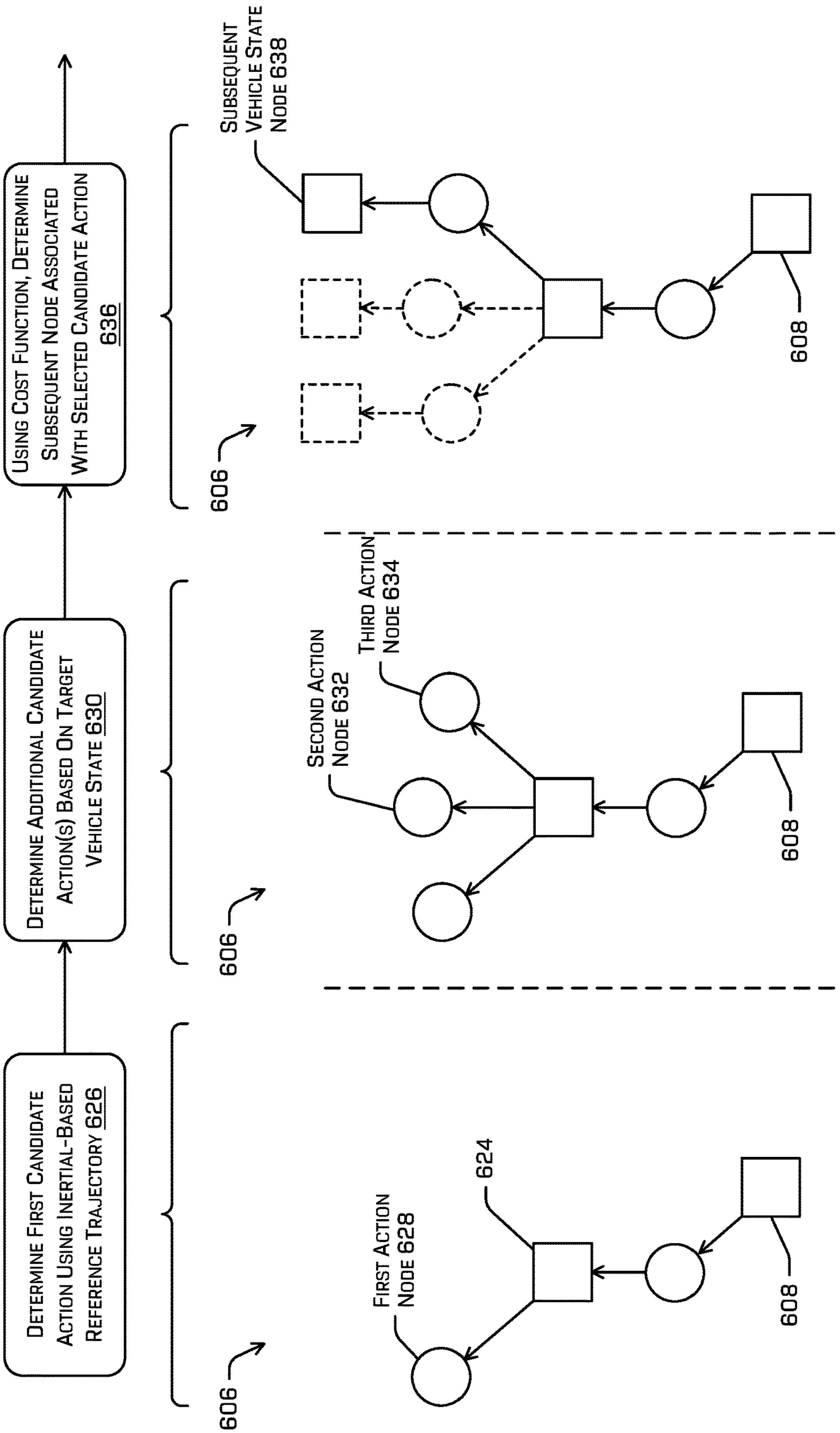

FIGS. 6A-6C illustrate a pictorial flow diagram of an example process 600 for generating a trajectory for controlling a vehicle (e.g., autonomous vehicle 102) using a tree search that includes iteratively determining candidate actions and evaluating corresponding vehicle/environment states to traverse the tree. Example process 600 may be executed by a planning component 112 of the autonomous vehicle 102 although, in at least some instances, example process 600 may be additionally or alternatively executed by a simulation component, perception component, and/or prediction component of the autonomous vehicle 102. In some examples, the tree search conducted by the guidance component may include executing a Monte-Carlo tree search (MCTS); partially observable Monte-Carlo planning (POMCP); Markov decision process (MDP), such as a partially observable MDP (POMDP); or the like improved with the techniques discussed herein, including agent filtering, upper/lower bound cost estimations, and/or defaulting to a default policy.

At operation 602, example process 600 may comprise receiving driving route data and sensor data associated with an environment, and determining a target vehicle on the designated driving route for the vehicle. FIG. 6A depicts an example driving environment in which an autonomous vehicle 102 is located in an off-route state (e.g., a parking lot, driveway, curbside or roadside turnout, etc. Based on the current off-route state of the autonomous vehicle 102, and the driving route onto which the vehicle intends to travel, the planning component 112 may determine an on-route target state 604. As described above, the planning component 112 may determine the target state 604 as a state in the reference trajectory of the driving lane on the route of the vehicle. In some examples, the planning component 112 may determine multiple target states associated with different driving lanes onto which the vehicle may join the route. The target state(s) may be determined based on any combination of the lateral and/or longitudinal distance between the vehicle and the various target states in the lane reference trajectory, the current heading of the vehicle relative to the direction of travel of the driving lane, the current velocity of the vehicle, and/or various features or capabilities of the vehicle such as the turning radius and maximum steering angle of the vehicle.

The sensor data received in operation 602 may include any of the sensor data associated with one or more sensors, according to any of the techniques discussed herein. The sensor(s) may be associated with the autonomous vehicle 102 and/or other computing devices. Operation 602 also may include determining environment state data based at least in part on the sensor data. In some examples, a perception component 110 may determine the environment state data for any static and/or dynamic objects detected by the perception component. For instance, the environment state data received in operation 602 may include positions, poses, trajectories, and/or other characteristics of the autonomous vehicle 102 and/or any others in the environment (e.g., other vehicles, pedestrians, bicycles, buildings, traffic signals, road debris, etc.).

At operation 606, the planning component 112 may determine, based at least in part on the sensor data, a root node 608 for a tree search, according to any of the techniques discussed herein. In some examples, determining the root node may comprise determining a data structure 610 for the tree search, which may comprise setting up and storing a directed acyclical graph (DAG); upper confidence bounds applied to trees (UCT); determinized sparse partially observable tree (DESPOT); or the like for modeling control states and environment states. The root node 608 may be associated with the current state of the autonomous vehicle 102 at the current time and/or the most recent sensor data or batch of sensor data. As such, the root node 608 may be associated with perception data that may or may not include prediction data, and/or may identify environment state data that includes a current position, orientation, velocity, acceleration, classification, etc. of static and/or dynamic objects (including similar information for the vehicle, which may be generated by the localization component of the vehicle) in the environment and may additionally or alternatively include historical data of the same.

At operation 612, shown in FIG. 6B, the planning component 112 may determine a first action node 614 based at least in part on the root node 608. In this example, the figures may depict state nodes (e.g., representing vehicle states and/or environment states, and which also may be referred to prediction nodes) as squares, and may depict candidate action nodes as circles. Dashed lines and/or may represent relationships between nodes that are as-of-yet undiscovered/undetermined and/or may represent nodes that have been discarded and are not to be further explored during the tree search. Action nodes, such as the first action node 614, may represent candidate actions for controlling the motion of the autonomous vehicle 102 (e.g., based at least in part on a previous state node), according to any of the techniques discussed herein. In this example, the first action node 614 may represent a candidate action determined based on an inertial-based candidate trajectory. Determining the first candidate action may include using a cubic spline or other mathematical function, to determine an action to move the vehicle in a kino-dynamically feasible way (e.g., without reference to the structure of the driving route) between the current off-route state to the target state 604.

At operation 616, the planning component 112 may determine a second action node 618 and a third action node 620 representing additional possible candidate actions for controlling the motion of the autonomous vehicle 102 based on the root node, according to any of the techniques discussed herein. In this example, the second action node 618 and the third action node 620 may represent route-based candidate actions, candidate actions based on the previous control trajectory of the autonomous vehicle 102, and/or candidate actions generated by perturbing other candidate actions using perturbation parameters.

At operation 622, the planning component 112 may use one or more cost functions to select a candidate action (or multiple candidate actions) for further exploration in the tree search, and/or to determine a subsequent vehicle state node 624 based on the selected candidate action. The determination of the costs and/or the selection of candidate actions may be performed using cost evaluator 320, according to any of the techniques discussed herein. For example, separate costs may be computed for each of the candidate actions (e.g., represented by the first action node 614, second action node 618, and third action node 620), based at least in part on a variety of sub-costs including proximity cost(s), safety cost(s), comfort cost(s), and/or progress cost(s). These sub-costs may be based at least in part on the environment state data indicated by the last vehicle state node (whether the last vehicle state node is the root node 608 or another vehicle state node). As an example, proximity cost(s) may be based at least in part on a minimum, average, or other distance that a candidate action takes the autonomous vehicle 102 from a static and/or dynamic object. The safety cost(s) may include a score indicating conformance to rules of the road, proximity to other object(s) and/or a velocity associated with the candidate action (e.g., the safety cost may penalize candidate actions that are close to (e.g., within a threshold distance of) an object and moving at a high speed and not penalize or only provide a small penalty to candidate actions that are close to an object but associated with a low speed—high-speed candidate actions that are far from other objects may be unpenalized by this cost), and/or proximity to a non-drivable surface (e.g., sidewalk, building, closed lane). In an example where the safety cost(s) include a variable cost based on velocity and lateral distance to an object, the cost may be determined based at least in part a hinge function, such as an L1 or L2 hinge function. In some examples, the hinge point in the hinge function where a penalty starts being applied may be based on distance to the object, velocity associated with the candidate action, object track, and/or object type. For example, a penalty may start applying further away from a biker than from a vehicle and/or a penalty may be higher/more severe for bikers than for vehicles. Moreover, the penalty may be more severe the faster the velocity associated with the candidate action once the candidate action is within the threshold distance of the vehicle (e.g., the hinge point of the hinge function). In at least one example, the threshold distance for applying the penalty specified by the L1 or L2 hinge function may be based at least in part on the velocity associated with the candidate action. In other words, fast candidate actions will have a penalty applied further from the object than slow candidate actions and the L1 or L2 penalty may become more severe (e.g., steeper slope in the case of L1, larger coefficient and/or squared value) the closer a fast candidate action comes to the object compared to the same distance from a slow candidate action to the object.

In some examples, comfort cost(s) may be based at least in part on a velocity, jerk, and/or acceleration associated with the candidate action and/or whether the candidate action would violate a threshold jerk and/or acceleration. The progress cost(s) may be based at least in part on completion of a mission or sub-goal and/or displacement of the autonomous vehicle 102 along a reference trajectory (e.g., the route-based reference trajectory and/or inertial-based reference trajectory). For example, the progress cost(s) may reward the further the autonomous vehicle 102 would be along the trajectory if the candidate action were executed. A cost that is calculated as a reward may have an opposite sign as the other sub-costs. For example, if there is a positive cost for a candidate action that would violate a comfort metric (e.g., the candidate action would exceed a threshold jerk), a reward may be a negative sub-cost. More details regarding how to determine the costs are discussed in U.S. patent application Ser. No. 16/872,284, filed May 11, 2020, the entirety of which is incorporated by reference herein.

In at least one example, the cost associated with a particular action node may include a cost of arrival (e.g., a sum of the costs of all the action node(s) leading up to that action node for any action node deeper than the first layer), a cost to execute the action (e.g., which may include the cost(s) discussed above, such as the comfort cost(s), progress cost(s), etc.), and a cost to progress further after that action node, which may also be characterized as the cost to transition to a different state in the future. Modeling this future cost, also called the cost-to-go, may be complex and require a large amount of computational power when the number of action nodes being explored in the tree search is considered. In reinforcement learning, the cost-to-go is also called the "value" of being at the particular state.

In some examples, the first action node 614, second action node 618, and third action node 620 each may be associated with controlling the vehicle over a first time period. As discussed below, candidate actions of a layer deeper than the layer associated with the first action node 614 (e.g., which includes action nodes 618 and 620) may be associated with controlling the vehicle over a second time period. In some examples, the time periods associated with each subsequent layer of action nodes may be equal or, in an additional or alternate example, the time periods may increase in length (e.g., exponentially, logarithmically). For example, the first set of candidate actions (including the first action node 614) may be associated with controlling the vehicle over a 1 second period, the second set of candidate actions (e.g., including action nodes 628, 632, and 634) one layer deeper than the first layer may control the vehicle over 1.1 seconds, a third layer may control the vehicle over a period of 1.25 seconds, and so on. This increasing time period may ensure that a greater precision and/or accuracy is obtained for imminent actions, while also ensuring that the more distant actions won't control the vehicle in a manner that results in higher costs/negative outcomes.

At operation 626, shown in FIG. 6C, the planning component 112 may determine another first action node 628 based at least in part on the previously selected vehicle state node 624. As in the previous node layer of action nodes, the first action node 628 may represent a candidate action for controlling the motion of the autonomous vehicle 102 based at least in part on the vehicle state node 624, according to any of the techniques discussed herein. In this example, the first action node 628 may represent an inertial-based candidate action determined using a cubic spline, based on the vehicle state data and/or environment state data associated with the vehicle state node 624, for controlling the autonomous vehicle 102 for a time period representing a second set of candidate actions.

At operation 630, the planning component 112 may determine an additional second action node 632 and a third action node 634 representing additional possible candidate actions for controlling the motion of the autonomous vehicle 102 based on the subsequent vehicle state node 624, according to any of the techniques discussed herein. In this example, the second action node 632 and the third action node 634 may represent route-based candidate actions, perturbed candidate action, etc., determined by the autonomous vehicle 102 based on the subsequent vehicle state node 624.

At operation 636, the planning component 112 may use one or more cost functions to select a candidate action for further exploration in the tree search, and/or to determine an additional subsequent vehicle state node 638 based on the selected candidate action (e.g., the third action node 634). As in the previous examples, the determination of the costs and/or the selection of candidate actions may be performed using cost evaluator 320, according to any of the techniques discussed herein, based on a variety of sub-costs including proximity costs, safety costs, comfort costs, and/or progress costs, etc. Although only two layers of candidate actions (and representative action nodes) and selected vehicle state nodes are shown in this example, it can be understood that the planning component 112 may perform similar or identical functions iteratively for any number of candidate action node layers, until an intended end state for the autonomous vehicle 102 is reached.

Figure 7:
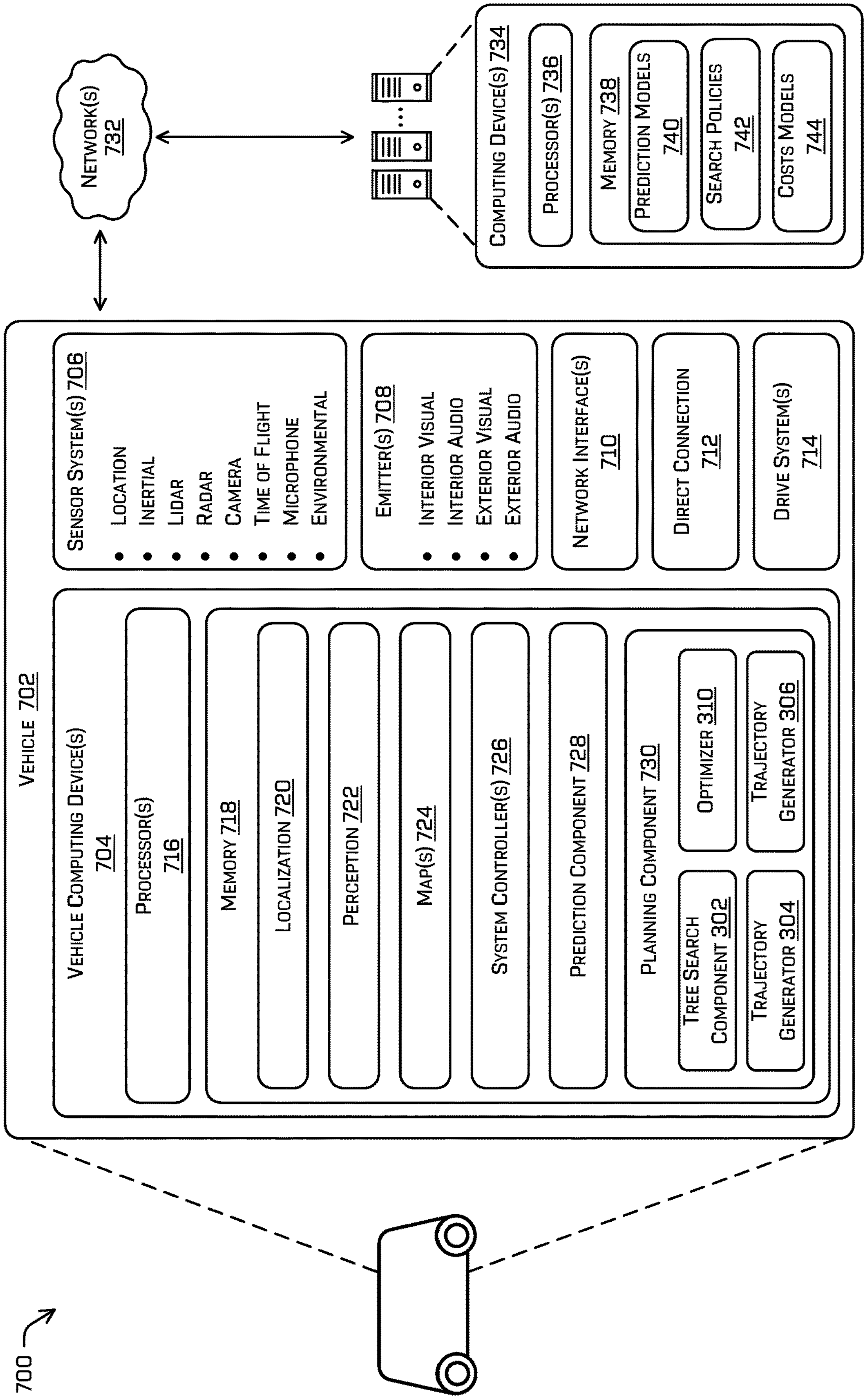
FIG. 7 is a block diagram illustrating an example system, including an autonomous vehicle and separate computing devices, for implementing various techniques described herein.

FIG. 7 is a block diagram of an example system 700 for implementing the techniques described herein. In at least one example, the system 700 may include a vehicle, such as vehicle 702. The vehicle 702 may include one or more vehicle computing devices 704, one or more sensor systems 706, one or more emitters 708, one or more network interfaces 710, at least one direct connection 712, and one or more drive systems 714.

The vehicle computing device 704 may include one or more processors 716 and memory 718 communicatively coupled with the processor(s) 716. In the illustrated example, the vehicle 702 is an autonomous vehicle; however, the vehicle 702 could be any other type of vehicle, such as a semi-autonomous vehicle, or any other system having driving trajectory planning/navigation functionality. For example, the vehicle 702 may be similar or identical to the autonomous vehicle 102 described above. In some instances, the autonomous vehicle 702 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 702 may be a fully or partially autonomous vehicle having any other level or classification.

In the illustrated example, the memory 718 of the vehicle computing device 704 stores a localization component 720, a perception component 722, one or more maps 724 (or map data), one or more system controllers 726, a prediction component 728, and a planning component 730 including a tree search component 302, an inertial-based trajectory generator 304, a route-based trajectory generator 306, and a trajectory optimizer 310. Though depicted in FIG. 7 as residing in the memory 718 for illustrative purposes, it is contemplated that the localization component 720, the perception component 722, the maps 724, the system controllers 726, the prediction component 728, the planning component 730, the tree search component 302, the inertial-based trajectory generator 304, the route-based trajectory generator 306, and the trajectory optimizer 310 may additionally, or alternatively, be accessible to the vehicle 702 (e.g., stored on, or otherwise accessible by, memory remote from the vehicle 702, such as, for example, memory 738 of one or more computing device(s) 734). In some examples, the memory 738 may include one or more prediction model(s) 740, one or more search policies 742, and/or one or more cost models/functions 744.

In at least one example, the localization component 720 may include functionality to receive sensor data from the sensor system(s) 706 to determine a position and/or orientation of the vehicle 702 (e.g., one or more of an x-, y-, z-position, roll, pitch, or yaw). For example, the localization component 720 may include and/or request/receive a map of an environment, such as from map(s) 724, and may continuously determine a location and/or orientation of the vehicle 702 within the environment. In some instances, the localization component 720 may utilize SLAM (simultaneous localization and mapping), CLAMS (calibration, localization and mapping, simultaneously), relative SLAM, bundle adjustment, non-linear least squares optimization, or the like to receive image data, lidar data, radar data, inertial measurement unit (IMU) data, GPS data, wheel encoder data, and the like to accurately determine a location of the vehicle 702. In some instances, the localization component 720 may provide data to various components of the vehicle 702 to determine an initial position of the vehicle 702 for determining the relevance of an object to the vehicle 702, as discussed herein.

In some instances, the perception component 722 may include functionality to perform object detection, segmentation, and/or classification. In some examples, the perception component 722 may provide processed sensor data that indicates a presence of an object (e.g., entity) that is proximate to the vehicle 702 and/or a classification of the object as an object type (e.g., car, pedestrian, cyclist, animal, building, tree, road surface, curb, sidewalk, unknown, etc.). In some examples, the perception component 722 may provide processed sensor data that indicates a presence of a stationary entity that is proximate to the vehicle 702 and/or a classification of the stationary entity as a type (e.g., building, tree, road surface, curb, sidewalk, unknown, etc.). In additional or alternative examples, the perception component 722 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

The memory 718 may further include one or more maps 724 that may be used by the vehicle 702 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 702 may be controlled based at least in part on the map(s) 724. That is, the map(s) 724 may be used in connection with the localization component 720, the perception component 722, the prediction component 728, and/or the planning component 730 to determine a location of the vehicle 702, detect objects in an environment, generate routes, determine actions and/or trajectories to navigate within an environment.

In some examples, the one or more maps 724 may be stored on a remote computing device(s) (such as the computing device(s) 734) accessible via network(s) 732. In some examples, multiple maps 724 may be stored based on, for example, a characteristic (e.g., type of entity, time of day, day of week, season of the year, etc.). Storing multiple maps 724 may have similar memory requirements, but increase the speed at which data in a map may be accessed.

In at least one example, the vehicle computing device 704 may include one or more system controllers 726, which may be configured to control steering, propulsion, braking, safety, emitters, communication, and other systems of the vehicle 702. The system controller(s) 726 may communicate with and/or control corresponding systems of the drive system(s) 714 and/or other components of the vehicle 702.

The prediction component 728 may generate one or more probability maps representing prediction probabilities of possible locations of one or more objects in an environment. For example, the prediction component 728 may generate one or more probability maps for vehicles, pedestrians, animals, and the like within a threshold distance from the vehicle 702. In some instances, the prediction component 728 may measure a track of an object and generate a discretized prediction probability map, a heat map, a probability distribution, a discretized probability distribution, and/or a trajectory for the object based on observed and predicted behavior. In some instances, the one or more probability maps may represent an intent of the one or more objects in the environment.

In some examples, prediction component 728 may include one or more ML prediction models, such as the active prediction model described above. The prediction component 728 may generate predicted trajectories of objects (e.g., objects) in an environment. For example, the prediction component 728 may generate one or more predicted trajectories for objects within a threshold distance from the vehicle 702. In some examples, the prediction component 728 may measure a trace of an object and generate a trajectory for the object based on observed and predicted behavior.

The planning component 730 may include various components and functionalities similar or identical to those of the planning component 112, described above. As discussed above, the planning component 730 may determine a trajectory for the vehicle 702 to traverse through an environment to perform an off-route to on-route driving maneuver. In various examples, the planning component 730 may determine various routes and trajectories at various levels of detail. For example, the planning component 730 may determine various trajectories to travel from a first location (e.g., a current off-route location) to a second location (e.g., a target on-route location). For the purpose of this discussion, a route may include a sequence of waypoints in a structured environment (e.g., including streets, intersections, etc.). The planning component 730 may generate instructions for guiding the vehicle 702 from a current state off of the driving route to a target state on the route designated for the vehicle. In at least one example, the planning component 730 may determine how to guide the vehicle 702 from a first off-route state in a sequence of states to a second state in the sequence of states. In some examples, the instruction may be a candidate trajectory, or a portion of a trajectory. In some examples, multiple trajectories may be substantially simultaneously generated (e.g., within technical tolerances) in accordance with a receding horizon technique. A single trajectory of the multiple trajectories in a receding data horizon having the highest confidence level may be selected to operate the vehicle. In various examples, the planning component 730 may select a trajectory for the vehicle 702.

In other examples, the planning component 730 may alternatively, or additionally, use data from the localization component 720, the perception component 722, map(s) 724, and/or the prediction component 728 to determine a trajectory for the vehicle 702 to follow to traverse through an environment. For example, the planning component 730 may receive data (e.g., object data) from the localization component 720, the perception component 722, and/or the prediction component 728 regarding objects associated with an environment. In some examples, the planning component 730 receives data for relevant objects within the environment. Using this data, the planning component 730 may determine a driving maneuver to travel from a first location (e.g., a current location) to a second location (e.g., an on-route target location) to avoid objects in an environment. In at least some examples, such a planning component 730 may determine there is no such collision-free trajectory and, in turn, provide a trajectory that brings the vehicle 702 safely to the target state while avoiding all collisions and/or otherwise mitigating damage.

In some instances, aspects of some or all of the components discussed herein may include any models, techniques, and/or machine learned techniques. For example, in some instances, the components in the memory 718 (and the memory 738, discussed below) may be implemented as a neural network.

As described herein, an exemplary neural network is a technique which passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 706 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 706 may include multiple instances of each of these or other types of sensors. For instance, the lidar sensors may include individual lidar sensors located at the corners, front, back, sides, and/or top of the vehicle 702. As another example, the camera sensors may include multiple cameras disposed at various locations about the exterior and/or interior of the vehicle 702. The sensor system(s) 706 may provide input to the vehicle computing device 704. Additionally, or in the alternative, the sensor system(s) 706 may send sensor data, via the one or more networks 732, to the one or more computing device(s) 734 at a particular frequency, after a lapse of a predetermined period of time, in near real-time, etc.

The vehicle 702 may also include one or more emitters 708 for emitting light and/or sound. The emitter(s) 708 may include interior audio and visual emitters to communicate with passengers of the vehicle 702. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 708 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 702 may also include one or more network interfaces 710 (or communication connections) that enable communication between the vehicle 702 and one or more other local or remote computing device(s). For instance, the network interfaces 710 may facilitate communication with other local computing device(s) on the vehicle 702 and/or the drive system(s) 714. Also, the network interface(s) 710 may allow the vehicle to communicate with other nearby computing device(s) (e.g., computing device(s) 734, other nearby vehicles, etc.) and/or one or more remote sensor system(s) for receiving sensor data. The network interface(s) 710 also may enable the vehicle 702 to communicate with a remote teleoperations computing device or other remote services.

The network interface(s) 710 may include physical and/or logical interfaces for connecting the vehicle computing device 704 to another computing device or a network, such as network(s) 732. For example, the network interface(s) 710 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 702 may include one or more drive systems 714. In some examples, the vehicle 702 may have a single drive system 714. In at least one example, if the vehicle 702 has multiple drive systems 714, individual drive systems 714 may be positioned on opposite ends of the vehicle 702 (e.g., the front and the rear, etc.). In at least one example, the drive system(s) 714 may include one or more sensor systems to detect conditions of the drive system(s) 714 and/or the surroundings of the vehicle 702. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive system(s) 714. In some cases, the sensor system(s) on the drive system(s) 714 may overlap or supplement corresponding systems of the vehicle 702 (e.g., sensor system(s) 706).

The drive system(s) 714 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 714 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive system(s) 714. Furthermore, the drive system(s) 714 may also include one or more communication connection(s) that enable communication by the respective drive module with one or more other local or remote computing device(s).

In at least one example, the direct connection 712 may provide a physical interface to couple the one or more drive system(s) 714 with the body of the vehicle 702. For example, the direct connection 712 may allow the transfer of energy, fluids, air, data, etc. between the drive system(s) 714 and the vehicle. In some instances, the direct connection 712 may further releasably secure the drive system(s) 714 to the body of the vehicle 702.

In at least one example, the localization component 720, the perception component 722, the maps 724, the system controllers 726, the prediction component 728, the planning component 730, the tree search component 302, the inertial-based trajectory generator 304, the route-based trajectory generator 306, and the trajectory optimizer 310 may process sensor data, as described above, and may send their respective outputs, over the one or more network(s) 732, to the computing device(s) 734. In at least one example, the localization component 720, the perception component 722, the maps 724, the system controllers 726, the prediction component 728, the planning component 730, the tree search component 302, the inertial-based trajectory generator 304, the route-based trajectory generator 306, and the trajectory optimizer 310 may send their respective outputs to the computing device(s) 734 at a particular frequency, after a lapse of a predetermined period of time, in near real-time, etc.

In some examples, the vehicle 702 may send sensor data to the computing device(s) 734 via the network(s) 732. In some examples, the vehicle 702 may receive sensor data from the computing device(s) 734 and/or remote sensor system(s) via the network(s) 732. The sensor data may include raw sensor data and/or processed sensor data and/or representations of sensor data. In some examples, the sensor data (raw or processed) may be sent and/or received as one or more log files.

The computing device(s) 734 may include processor(s) 736 and a memory 738, which may include one or more prediction model(s) 740, one or more search policies 742, and/or one or more cost models/functions 744. In some examples, computing device(s) 734 may store various prediction model(s) 740, search policies 742, and/or cost models/functions 744, which may be associated with various different models of autonomous vehicles (e.g., having different capabilities and kino-dynamically feasible trajectories), different driving environments (e.g., regions, driving scene types, etc.), and/or different driving conditions (e.g., traffic conditions, road conditions, weather conditions, etc.). In such examples, the computing device(s) 734 may be configured to provide various combinations of mathematical functions and/or heuristics for generating inertial-based reference trajectories and/or route-based trajectories, as well as search exploration policies, and/or cost evaluator component(s) associated various different vehicles (e.g., 702), depending on the type, model, features, current driving environment, current driving conditions, etc., of the vehicles. Additionally, in some examples, the memory 738 may store one or more of components that are similar to the component(s) stored in the memory 718 of the vehicle 702. In such examples, the computing device(s) 734 may be configured to perform one or more of the processes described herein with respect to the vehicle 702.

The processor(s) 716 of the vehicle 702 and the processor(s) 736 of the computing device(s) 734 may be any suitable processor capable of executing instructions to process data and perform operations as described herein. By way of example and not limitation, the processor(s) may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 718 and memory 738 are examples of non-transitory computer-readable media. The memory 718 and memory 738 may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 7 is illustrated as a distributed system, in alternative examples, components of the vehicle 702 may be associated with the computing device(s) 734 and/or components of the computing device(s) 734 may be associated with the vehicle 702. That is, the vehicle 702 may perform one or more of the functions associated with the computing device(s) 734, and vice versa.

Figure 8:
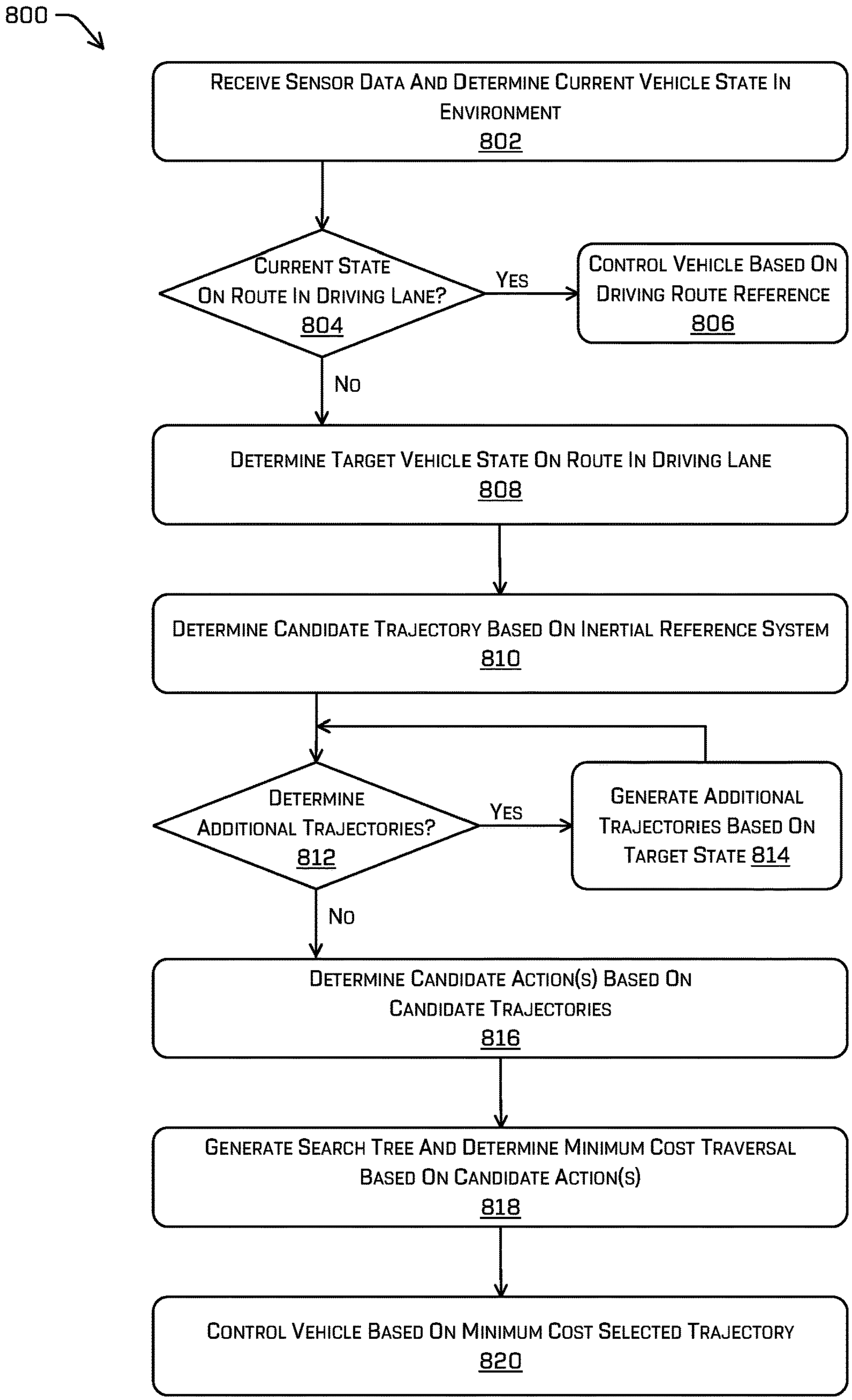
FIG. 8 is a flow diagram illustrating an example technique for determining and following a trajectory to control a vehicle from an off-route vehicle state to a target vehicle state on a driving route, in accordance with one or more examples of the disclosure.

FIG. 8 is a flow diagram illustrating an example process 800 for determining and executing a trajectory to control a vehicle from an initial off-route state to a target state on the driving route designated for the vehicle. As described herein, the operations of process 800 may be performed by a planning component 112, including various subcomponents and/or by invoking related components (e.g., including those described in FIG. 3), operating within an autonomous vehicle 102.

At operation 802, the autonomous vehicle 102 may receive sensor data via a perception component 110, to determine a current vehicle state in the driving environment. Based on the sensor data received via the perception component 110, the planning component 112 may determine that the current vehicle state is an on-route driving location, or an off-route location such as a parking location, a passenger pickup location, a pull-over location (e.g., for an emergency vehicle, etc.), or the like. Additionally, based on an intended destination for the vehicle (e.g., a desired location communicated to the vehicle computing system from a passenger or dispatcher), the planning component 112 may determine a driving route for the vehicle to reach the intended destination.

At operation 804, the planning component 112 may determine whether the current vehicle state is an on-route state. As described above, an on-route state may be a state in which the vehicle is on the road surface (e.g., within a threshold distance of a lane reference trajectory) and/or the vehicle heading corresponds to the directionality of the driving lane/roadway (e.g., within a threshold heading angle of the lane direction). Based on a determination that the current vehicle state is an on-route state (804: Yes), then at operation 806 the planning component 112 may control the autonomous vehicle based at least in part on the driving route structure (e.g., using reference trajectories of driving lanes, waypoints connecting road/lane segments, etc.).

In other examples, when determining that the current vehicle state is an off-route state (804:No), then at operation 808 the planning component 112 may determine a target vehicle state on a driving lane of the driving route associated with the vehicle. For example, the planning component 112 may identify a portion of the driving route (e.g., a roadway and/or driving lane) accessible to the vehicle from the current vehicle state, and determine a particular state in the lane reference trajectory of the roadway as the target state for the autonomous vehicle 102. As described above, the planning component 112 may determine the target state based on, for example, the lateral and/or longitudinal positions of the various target states in the lane reference trajectory relative to the current vehicle state, as well as the current heading of the vehicle relative to the direction of travel of the driving lane, the current velocity of the vehicle, and/or various features or capabilities of the vehicle (e.g., turning radius, maximum steering angle, etc.).

At operation 810, the planning component 112 may determine a first candidate trajectory in accordance with an inertial (or inertial-based reference system). In various examples, the planning component 112 may determine the first candidate trajectory using mathematical functions (e.g., cubic spline, Bezier curve, series of clothoids, etc.) based on the relative positions, headings, and velocities associated with the current vehicle state and the target state. As described above, the first candidate trajectory determined in operation 810 may be determined without reference to the lane reference trajectory of the driving lanes/roadways of the driving route.

At operation 812, the planning component 112 may determine whether additional candidate trajectories are to be generated for controlling the vehicle between the current off-route state and the on-route vehicle state. In some examples, the planning component 112 may implement one or more thresholds for generating particular numbers of candidate trajectories and/or particular types of candidate trajectories. Such thresholds may be based on the current location and/or heading of the vehicle relative to the target state or roadway. For instance, the planning component may use various heuristics to determine when a current vehicle state is relatively close to the target state (e.g., within a distance threshold, heading difference threshold, and/or velocity difference threshold), or relatively far from the target state. Based on such heuristics, the planning component 112 may determine an overall number of candidate trajectories to generate (e.g., a minimum number) and the type of candidate trajectories to generate (e.g., a number of route-based trajectories, a number of inertial-based trajectories, a number of perturbed route-based trajectories, a number of perturbed inertial-based trajectories, etc.).

When the planning component 112 determines that additional candidate trajectories should be generated for use in the tree search (812: Yes), then in operation 814 the planning component 112 may generate the additional trajectories. As described above, the planning component 112 may use one or more of an inertial-based candidate action generator 304, route-based candidate action generator 306, and/or perturbed candidate action generator 308 to generate a dense set of candidate trajectories of the desired type.

After the planning component 112 has generated a sufficient number of candidate trajectories for use in the tree search (812:No), then in operation 816 the planning component 112 may determine candidate actions associated with the respective candidate trajectories. For example, candidate actions may include fine vehicle control instructions such as velocities, velocity changes, steering angles, steering angle changes, yaw rates, yaw rate changes, and the like, that may be output by the planning component 112 and implemented by the drive systems of the vehicle.

At operation 818, the planning component 112 may generate a search tree and determine a minimum cost traversal (or multiple traversals) based on the candidate actions associated with the candidate trajectories. As described above, any number of tree search techniques may be used during which the planning component 112 may evaluate the set of candidate trajectories between the current off-route vehicle state to the on-route target state. Various tree search techniques may iteratively determine sets of candidate actions based on the candidate trajectories, predict the potential future states of the vehicle (and environment) responsive to the candidate actions, and use cost functions to evaluate the candidate actions based on the predicted future state of the vehicle and the driving environment as a whole. Finally, at operation 820, the planning component 112 may use the outputs of the tree search to determine a control trajectory (or multiple trajectories) that may be followed by the autonomous vehicle 102 to perform the off-route to on-route driving maneuver and join the driving route.

The methods described herein represent sequences of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes. In some examples, one or more operations of the method may be omitted entirely. For instance, the operations may include determining a first action and a second action by the vehicle relative to a selected trajectory without determining a respective cost for one or more of the actions by the vehicle. Moreover, the methods described herein may be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

EXAMPLE CLAUSES

A. A vehicle comprising: one or more processors; and one or more non-transitory computer-readable media storing computer-executable instructions that, when executed, cause the one or more processors to perform operations comprising: determining an absence of a lane constraint associated with a current vehicle state of the vehicle; determining a target vehicle state for the vehicle associated with a portion of the environment having a lane constraint; determining a first candidate path for the vehicle, based at least in part on: the current vehicle state, the target vehicle state, a distance between the current vehicle state and the driving route, a heading associated with the current vehicle state, and a direction associated with the target vehicle state; determining, based at least in part on the current vehicle state and the target vehicle state, a second candidate path for the vehicle, wherein determining the second candidate path is based at least in part on a route-based reference system associated with the lane constraint; determining, based at least in part on the first candidate path, a first candidate action for controlling motion of the vehicle; determining, based at least in part on the second candidate path, a second candidate action for controlling motion of the vehicle; generating, based at least in part on the first candidate action and the second candidate action, a tree structure; determining a traversal of the tree structure associated with a minimum cost; determining a control path for the vehicle, based at least in part on the traversal of the tree structure; and controlling the vehicle based at least in part on the control path.

B. The vehicle of paragraph A, the operations further comprising: determining a third candidate path for the vehicle, wherein determining the third candidate path comprises perturbing at least one of the first candidate path or the second candidate path; determining, based at least in part on the third candidate path, a third candidate action for controlling motion of the vehicle; wherein generating the tree structure is further based at least in part on the third candidate action.

C. The vehicle of paragraph A, the operations further comprising: receiving, as a third candidate path, a previous control path associated with a previous planning cycle of the vehicle; and determining, based at least in part on the third candidate path, a third candidate action for controlling motion of the vehicle, wherein generating the tree structure is further based at least in part on the third candidate action.

D. The vehicle of paragraph A, wherein generating the tree structure comprises: associating the current vehicle state with a first node of the tree structure; determining a cost associated with the first candidate action; determining, based at least in part on the cost, the first candidate action for further exploration in the tree structure; and determining a second node of the tree structure, based at least in part on the first candidate action.

E. The vehicle of paragraph D, wherein the cost is associated with one or more of: a safety cost; a progress cost; a comfort cost; or an energy efficiency cost.

F. A method comprising: determining a first candidate trajectory for a vehicle, based at least in part on a current vehicle state and a target vehicle state, wherein the target vehicle state is on a driving lane of a driving route associated with the vehicle, and the current vehicle state is off of the driving lane; determining, based at least in part on the first candidate trajectory, a first candidate action for controlling motion of the vehicle; generating, based at least in part on the first candidate action, a tree structure; determining a control trajectory for the vehicle, based at least in part on the tree structure; and controlling the vehicle based at least in part on the control trajectory.

G. The method of paragraph F, wherein determining the first candidate trajectory is based at least in part on an inertial-based reference system, and wherein the method further comprises: determining a second candidate trajectory based at least in part on a route-based reference system associated with the driving lane.

H. The method of paragraph F, wherein determining the first candidate trajectory is based at least in part on an inertial-based reference system, and wherein the method further comprises: determining a second candidate trajectory by perturbing the first candidate trajectory using at least one of: a lateral shifting parameter; or a velocity scaling parameter.

I. The method of paragraph F, wherein determining the first candidate trajectory is based at least in part on an inertial-based reference system, and wherein the method further comprises: determining a second candidate trajectory based at least in part on a previous control trajectory associated with a previous planning cycle of the vehicle.

J. The method of paragraph F, wherein the first candidate trajectory comprises: a cubic spline; a sigmoid; a Bezier curve; or a series of clothoids.

K. The method of paragraph F, wherein determining the control trajectory comprises determining a traversal of the tree structure associated with a minimum cost.

L. The method of paragraph F, wherein generating the tree structure comprises: associating the current vehicle state with a first node of the tree structure; determining a cost associated with the first candidate action; selecting, based at least in part on the cost, the first candidate action for further exploration in the tree structure; and determining a second node of the tree structure, based at least in part on the first candidate action.

M. The method of paragraph F, wherein the cost is associated with one or more of: a safety cost, a progress cost, a comfort cost, or an energy efficiency cost.

N. One or more non transitory computer readable media storing instructions executable by a processor, wherein the instructions, when executed, cause the processor to perform operations comprising: determining a first candidate trajectory for a vehicle, based at least in part on a current vehicle state and a target vehicle state, wherein the target vehicle state is on a driving lane of a driving route associated with the vehicle, and the current vehicle state is off of the driving lane; determining, based at least in part on the first candidate trajectory, a first candidate action for controlling motion of the vehicle; generating, based at least in part on the first candidate action, a tree structure; determining a control trajectory for the vehicle, based at least in part on the tree structure; and controlling the vehicle based at least in part on the control trajectory.

O. The one or more non transitory computer readable media of paragraph N, wherein determining the first candidate trajectory is based at least in part on an inertial-based reference system, and wherein the method further comprises: determining a second candidate trajectory based at least in part on a route-based reference system associated with the driving lane.

P. The one or more non transitory computer readable media of paragraph N, wherein determining the first candidate trajectory is based at least in part on an inertial-based reference system, and wherein the method further comprises: determining a second candidate trajectory by perturbing the first candidate trajectory using at least one of: a lateral shifting parameter; or a velocity scaling parameter.

Q. The one or more non transitory computer readable media of paragraph N, wherein determining the first candidate trajectory is based at least in part on an inertial-based reference system, and wherein the method further comprises: determining a second candidate trajectory based at least in part on a previous control trajectory associated with a previous planning cycle of the vehicle.

R. The one or more non transitory computer readable media of paragraph N, wherein the first candidate trajectory comprises: a cubic spline; a sigmoid; a Bezier curve; or a series of clothoids.

S. The one or more non transitory computer readable media of paragraph N, wherein determining the control trajectory comprises determining a traversal of the tree structure associated with a minimum cost.

T. The one or more non transitory computer readable media of paragraph N, wherein generating the tree structure comprises: associating the current vehicle state with a first node of the tree structure; determining a cost associated with the first candidate action; selecting, based at least in part on the cost, the first candidate action for further exploration in the tree structure; and determining a second node of the tree structure, based at least in part on the first candidate action.

While the example clauses described above are described with respect to particular implementations, it should be understood that, in the context of this document, the content of the example clauses can be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A vehicle comprising:

one or more processors; and one or more non-transitory computer-readable media storing computer-executable instructions that, when executed, cause the one or more processors to perform operations comprising:

determining an absence of a lane constraint associated with a current vehicle state of the vehicle;

determining a target vehicle state for the vehicle, the target vehicle state associated with a portion of an environment having a lane constraint;

determining, based at least in part on the current vehicle state, the target vehicle state, and a distance between the current vehicle state and a driving route, an inertial-based candidate path for the vehicle, wherein determining the inertial-based candidate path is based at least in part on an inertial-based reference system;

determining, based at least in part on the current vehicle state and the target vehicle state, a route-based candidate path for the vehicle, wherein determining the route-based candidate path is based at least in part on a route-based reference system associated with the lane constraint;

determining, based at least in part on the inertial-based candidate path for the vehicle, an inertial-based candidate action for controlling motion of the vehicle;

determining, based at least in part on the route-based candidate path for the vehicle, a route-based candidate action for controlling motion of the vehicle;

generating, based at least in part on the inertial-based candidate action for controlling motion of the vehicle and the route-based candidate action for controlling motion of the vehicle, a tree data structure, wherein the tree data structure comprises a plurality of nodes, an individual node of the plurality of nodes associated with one of the inertial-based candidate action for controlling motion of the vehicle, the route-based candidate action for controlling motion of the vehicle, or a perturbed candidate action for controlling motion of the vehicle;

determining a traversal of the tree data structure associated with a minimum cost;

determining a control path for the vehicle, based at least in part on the traversal of the tree data structure associated with the minimum cost; and controlling the vehicle based at least in part on the control path.

2. The vehicle of claim 1, the operations further comprising:

determining a perturbed candidate path for the vehicle, wherein determining the perturbed candidate path for the vehicle comprises perturbing at least one of the inertial-based candidate path for the vehicle or the route-based candidate path for the vehicle; and determining, based at least in part on the perturbed candidate path for the vehicle, a perturbed candidate action for controlling motion of the vehicle.

3. The vehicle of claim 1, the operations further comprising:

receiving, as an additional candidate path for the vehicle, a previous control path associated with a previous planning cycle of the vehicle; and determining, based at least in part on the additional candidate path for the vehicle, an additional candidate action for controlling motion of the vehicle, wherein generating the tree data structure is further based at least in part on the additional candidate action for controlling motion of the vehicle.

4. The vehicle of claim 1, wherein generating the tree data structure further comprises:

determining a cost associated with the inertial-based candidate action;

determining, based at least in part on the cost associated with the inertial-based candidate action, the inertial-based candidate action for further exploration in the tree data structure; and determining a subsequent node of the tree data structure, based at least in part on the inertial-based candidate action.

5. The vehicle of claim 4, wherein the cost associated with the inertial-based candidate action is one of:

a safety cost;
a progress cost;
a comfort cost; or
an energy efficiency cost.

6. A method comprising:

determining an inertial-based candidate trajectory for a vehicle, based at least in part on an inertial-based reference system, a current vehicle state, a target vehicle state, and a distance between the current vehicle state and a driving route associated with the vehicle, wherein the target vehicle state is on a driving lane of the driving route associated with the vehicle, and the current vehicle state is off of the driving lane;

determining a route-based candidate trajectory for the vehicle, based at least in part on the current vehicle state and the target vehicle state, wherein determining the route-based candidate trajectory is based at least in part on a route-based reference system associated with a lane constraint of the driving lane of the driving route associated with the vehicle;

determining, based at least in part on the inertial-based candidate trajectory for the vehicle, an inertial-based candidate action for controlling motion of the vehicle;

determining, based at least in part on the route-based candidate trajectory for the vehicle, a route-based candidate action for controlling motion of the vehicle;

generating, based at least in part on the first inertial-based candidate action for controlling motion of the vehicle and the route-based candidate action for controlling motion of the vehicle, a tree data structure, wherein the tree data structure comprises a plurality of nodes, an individual node of the plurality of nodes associated with one of the inertial-based candidate action for controlling motion of the vehicle, the route-based candidate action for controlling motion of the vehicle, or a perturbed candidate action for controlling motion of the vehicle;

determining a traversal of the tree data structure associated with a minimum cost;

determining a control trajectory for the vehicle, based at least in part on the traversal of the tree data structure associated with the minimum cost; and controlling the vehicle based at least in part on the control trajectory.

7. The method of claim 6, further comprising:

performing trajectory optimization on a set of candidate trajectories including the route-based candidate trajectory for the vehicle and the inertial-based candidate trajectory for the vehicle, wherein the trajectory optimization comprises excluding, from the tree data structure, one or more candidate trajectories of the set of candidate trajectories that intersect with a position of a static object detected in an environment associated with the vehicle.

8. The method of claim 6, further comprising:

determining a perturbed candidate trajectory for the vehicle by perturbing the inertial-based candidate trajectory for the vehicle using at least one of:

a lateral shifting parameter; or
a velocity scaling parameter.

9. The method of claim 6, further comprising:

determining an additional candidate trajectory for the vehicle based at least in part on a previous control trajectory associated with a previous planning cycle of the vehicle.

10. The method of claim 6, wherein the inertial-based candidate trajectory for the vehicle comprises:

a cubic spline;
a sigmoid;
a Bezier curve; or
a series of clothoids.

11. The vehicle of claim 1, the operations further comprising performing optimization on a set of candidate paths including the route-based candidate path for the vehicle and the inertial-based candidate path for the vehicle, wherein the optimization comprises excluding, from the tree data structure, one or more candidate paths of the set of candidate paths that intersect with a position of a static object detected in the environment.

12. The method of claim 6, wherein generating the tree data structure further comprises:

determining a cost associated with the inertial-based candidate action for controlling motion of the vehicle;

determining, based at least in part on the cost associated with the inertial-based candidate action for controlling motion of the vehicle, the inertial-based candidate action for controlling motion of the vehicle for further exploration in the tree data structure; and determining a subsequent node of the tree data structure, based at least in part on the inertial-based candidate action for controlling motion of the vehicle.

13. The method of claim 12, wherein the cost associated with the inertial-based candidate action for controlling motion of the vehicle is one of:

a safety cost, a progress cost, a comfort cost, or an energy efficiency cost.

14. One or more non-transitory computer-readable media storing instructions executable by a processor, wherein the instructions, when executed, cause the processor to perform operations comprising:

determining an inertial-based candidate trajectory for a vehicle, based at least in part on an inertial-based reference system, a current vehicle state, a target vehicle state, and a distance between the current vehicle state and a driving route associated with the vehicle, wherein the target vehicle state is on a driving lane of the driving route associated with the vehicle, and the current vehicle state is off of the driving lane;

determining a route-based candidate trajectory for the vehicle, based at least in part on the current vehicle state and the target vehicle state, wherein determining the route-based candidate trajectory for the vehicle is based at least in part on a route-based reference system associated with a lane constraint of the driving lane of the driving route associated with the vehicle;

determining, based at least in part on the inertial-based candidate trajectory for the vehicle, an inertial-based candidate action for controlling motion of the vehicle;

determining, based at least in part on the route-based candidate trajectory for the vehicle, a route-based candidate action for controlling motion of the vehicle;

generating, based at least in part on the inertial-based candidate action for controlling motion of the vehicle and the route-based candidate action for controlling motion of the vehicle, a tree data structure, wherein the tree data structure comprises a plurality of nodes, an individual node of the plurality of nodes associated with one of the inertial-based candidate action for controlling motion of the vehicle, the route-based candidate action for controlling motion of the vehicle, or a perturbed candidate action for controlling motion of the vehicle;

determining a traversal of the tree data structure associated with a minimum cost;

determining a control trajectory for the vehicle, based at least in part on the traversal of the tree data structure associated with the minimum cost; and controlling the vehicle based at least in part on the control trajectory.

15. The one or more non-transitory computer-readable media of claim 14, the operations further comprising:

performing trajectory optimization on a set of candidate trajectories including the route-based candidate trajectory for the vehicle and the inertial-based candidate trajectory for the vehicle, wherein the trajectory optimization comprises excluding, from the tree data structure, one or more candidate trajectories of the set of candidate trajectories that intersect with a position of a static object detected in an environment associated with the vehicle.

16. The one or more non-transitory computer-readable media of claim 14, the operations further comprising:

determining a perturbed candidate trajectory for the vehicle by perturbing the inertial-based candidate trajectory for the vehicle using at least one of:

a lateral shifting parameter; or a velocity scaling parameter.

17. The one or more non-transitory computer-readable media of claim 14, the operations further comprising:

determining an additional candidate trajectory for the vehicle based at least in part on a previous control trajectory associated with a previous planning cycle of the vehicle.

18. The one or more non-transitory computer-readable media of claim 14, wherein the inertial-based candidate trajectory for the vehicle comprises:

a cubic spline;

a sigmoid;

a Bezier curve; or a series of clothoids.

19. The method of claim 6, wherein determining the traversal of the tree data structure associated with the minimum cost comprises:

iteratively determining sets of candidate actions based at least in part on the inertial-based candidate trajectory for the vehicle and the route-based candidate trajectory for the vehicle;

predicting potential future states of the vehicle and an environment associated with the vehicle responsive to individual candidate actions of the sets of candidate actions; and evaluating the individual candidate actions of the sets of candidate actions using one or more cost functions and based at least in part on the potential future states of the vehicle and the environment.

20. The one or more non-transitory computer-readable media of claim 14, wherein generating the tree data structure further comprises:

determining a cost associated with the inertial-based candidate action for controlling motion of the vehicle;

determining, based at least in part on the cost associated with the inertial-based candidate action for controlling motion of the vehicle, the inertial-based candidate action for controlling motion of the vehicle for further exploration in the tree data structure; and determining a subsequent node of the tree data structure, based at least in part on the inertial-based candidate action for controlling motion of the vehicle.

* * * * *